(12) United States Patent
Iwai et al.

(10) Patent No.: US 9,429,087 B2
(45) Date of Patent: Aug. 30, 2016

(54) SPARK IGNITION ENGINE

(71) Applicant: MAZDA MOTOR CORPORATION, Hiroshima (JP)

(72) Inventors: Kouhei Iwai, Hiroshima (JP); Junichi Taga, Higashihiroshima (JP); Keiji Araki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 8 days.

(21) Appl. No.: 14/426,010

(22) PCT Filed: Mar. 27, 2013

(86) PCT No.: PCT/JP2013/002072
§ 371 (c)(1),
(2) Date: Mar. 4, 2015

(87) PCT Pub. No.: WO2014/038108
PCT Pub. Date: Mar. 13, 2014

(65) Prior Publication Data
US 2015/0226143 A1    Aug. 13, 2015

(30) Foreign Application Priority Data
Sep. 7, 2012    (JP) ................. 2012-197025

(51) Int. Cl.
*F02D 41/00*    (2006.01)
*F02D 41/30*    (2006.01)
(Continued)

(52) U.S. Cl.
CPC ........... *F02D 41/0057* (2013.01); *F02B 11/00* (2013.01); *F02B 23/101* (2013.01); *F02B29/0418* (2013.01); *F02D 13/0203* (2013.01); *F02D 13/0207* (2013.01);
(Continued)

(58) Field of Classification Search
CPC .. F02D 41/00; F02D 41/0057; F02D 41/006; F02D 41/30; F02D 41/3064; F02D 13/02; F02D 13/0203; F02B 11/00; F02M 25/07; F02M 25/0747; Y02T 10/121; Y02T 10/47
USPC .............. 123/294–298, 305, 568.11, 568.12, 123/568.14; 701/103–105, 111
See application file for complete search history.

(56) References Cited

U.S. PATENT DOCUMENTS 7,818,112 B2 * 10/2010 Kuzuyama ................ F02B 1/12
123/295
8,175,789 B2 *  5/2012 Kojima ................. F02D 35/025
123/299
(Continued)

FOREIGN PATENT DOCUMENTS

JP    2003-343313 A    12/2003
JP    2007-154859 A    6/2007
(Continued)

OTHER PUBLICATIONS

International Search Report; PCT/JP2013/002072; May 7, 2013.

*Primary Examiner* — John Kwon
*Assistant Examiner* — Jonny H Hoang
(74) *Attorney, Agent, or Firm* — Studebaker & Brackett PC

(57) ABSTRACT

A controller performs switching between a compression ignition mode in which compression ignition combustion is performed to operate an engine body, and a spark ignition mode in which spark ignition combustion is performed to drive a spark plug to ignite and combust an air-fuel mixture in a cylinder. The controller reduces an EGR ratio to be lower than an EGR ratio set in the compression ignition mode to operate the engine body in a transitional mode in which the compression ignition combustion is performed in switching from the spark ignition mode to the compression ignition mode.

16 Claims, 14 Drawing Sheets

(51) Int. Cl.
*F02D 21/08* (2006.01)
*F02B 23/10* (2006.01)
*F02B 29/04* (2006.01)
*F02D 13/02* (2006.01)
*F02B 11/00* (2006.01)
*F02B 1/12* (2006.01)
*F02D 41/40* (2006.01)
*F02D 37/02* (2006.01)

(52) U.S. Cl.
CPC ..... *F02D 13/0261* (2013.01); *F02D 13/0273* (2013.01); *F02D 21/08* (2013.01); *F02D 41/0002* (2013.01); *F02D 41/006* (2013.01); *F02D 41/0055* (2013.01); *F02D 41/3035* (2013.01); *F02D 41/3064* (2013.01); *F02B 1/12* (2013.01); *F02B 29/0437* (2013.01); *F02D 37/02* (2013.01); *F02D 41/402* (2013.01); *F02D 2041/001* (2013.01); *Y02T 10/125* (2013.01); *Y02T 10/146* (2013.01); *Y02T 10/18* (2013.01); *Y02T 10/42* (2013.01); *Y02T 10/47* (2013.01)

(56) References Cited

U.S. PATENT DOCUMENTS

| | | | |
|---|---|---|---|
| 8,428,854 B2* | 4/2013 | Shinohara | F02D 13/0265 123/568.14 |
| 8,667,952 B2* | 3/2014 | Sangkyu | F02B 37/013 123/299 |
| 2004/0182359 A1* | 9/2004 | Stewart | F02B 1/12 123/295 |
| 2006/0016423 A1* | 1/2006 | Kuo | F02D 13/0215 123/299 |
| 2008/0147300 A1 | 6/2008 | Kakuya et al. | |
| 2009/0125213 A1 | 5/2009 | Kuzuyama | |

FOREIGN PATENT DOCUMENTS

| | | |
|---|---|---|
| JP | 2008-151021 A | 7/2008 |
| JP | 2009-097416 A | 5/2009 |
| JP | 2009-197740 A | 9/2009 |

* cited by examiner

SPARK IGNITION ENGINE

TECHNICAL FIELD

The disclosed technology relates to a spark ignition engine.

BACKGROUND ART

As described in Patent Document 1, for example, a combustion pattern by compression ignition of an air-fuel mixture in a cylinder has been known as a technology for improving both of exhaust emission performance and thermal efficiency of an engine. However, the compression ignition combustion involves a drastic pressure increase with an increase in load of the engine, and leads to increase in combustion noise. Thus, as described in Patent Document 1, the compression ignition combustion engine generally employs, in place of the compression ignition, spark ignition by driving a spark plug in a high-load operation range.

Patent Document 2 describes an engine which performs the compression ignition combustion in a low-load, low-speed range like the engine of Patent Document 1. This engine keeps a high temperature burnt gas in the cylinder by adjusting a period in which an intake valve and an exhaust valve are open in a range of compression ignition combustion to increase the temperature in the cylinder and accelerate compression auto-ignition combustion. In a high-load, high-speed range in the range of compression ignition combustion, the engine advances the timing of opening the intake valve to blow the burnt gas in the cylinder back to an intake port, and then reintroduces the burnt gas into the cylinder together with fresh air. Thus, the fresh air reduces the temperature of the burnt gas, and a compression end temperature relatively decreases in the high-load, high-speed range, thereby reducing sudden pressure increase by the compression ignition combustion.

CITATION LIST

Patent Documents

[Patent Document 1] Japanese Unexamined Patent Publication No. 2007-154859

[Patent Document 2] Japanese Unexamined Patent Publication No. 2009-197740

SUMMARY OF THE INVENTION

Technical Problem

In the spark ignition combustion, the temperature of a combustion gas increases due to relatively low thermal efficiency. In the compression ignition combustion, as described in the patent documents mentioned above, the high temperature burnt gas is introduced into the cylinder to ensure ignitability. Accordingly, the temperature in the cylinder is relatively high immediately after the engine is switched from the spark ignition combustion to the compression ignition combustion, and the high temperature burnt gas generated by the spark ignition combustion is introduced into the cylinder to excessively increase the temperature in the cylinder. This may lead to preignition, i.e., the air-fuel mixture in the cylinder is compression-ignited in a compression stroke, for example, and a rate of pressure increase (dP/dθ) in the cylinder rapidly increases to make loud combustion noise.

The switching from the spark ignition combustion to the compression ignition combustion is performed not only when the load of the engine decreases, for example, but also when the load of the engine remains unchanged. The switching may also be performed, for example, when the temperature of the engine increases from a cold range to a warm range, or in other situations.

In view of the foregoing, the disclosed technology has been achieved to avoid an increase in combustion noise when the engine is switched from the spark ignition combustion to the compression ignition combustion.

Solution to the Problem

According to the disclosed technology, an EGR ratio, which is a ratio of an amount of an exhaust gas introduced into the cylinder, is temporarily reduced immediately after the engine is switched from the spark ignition combustion to the compression ignition combustion. This reduces an amount of a high temperature exhaust gas generated by the spark ignition combustion and introduced into the cylinder, and reduces the temperature in the cylinder immediately after the switching to the compression ignition combustion. Thus, the preignition of the air-fuel mixture is avoided, and the generation of the combustion noise is avoided.

Specifically, the disclosed technology relates to a spark ignition engine. The engine includes: an engine body having a cylinder; a spark plug disposed to face an inside of the cylinder, and configured to ignite an air-fuel mixture in the cylinder; an exhaust returning apparatus configured to introduce an exhaust gas into the cylinder; and a controller configured to operate the engine body by controlling at least the spark plug and the exhaust returning apparatus.

The controller performs switching between a compression ignition mode in which compression ignition combustion is performed by auto-ignition of the air-fuel mixture in the cylinder to operate the engine body, and a spark ignition mode in which spark ignition combustion is performed by driving the spark plug to ignite and combust the air-fuel mixture in the cylinder to operate the engine body, and the controller controls the exhaust returning apparatus at least in the compression ignition mode to introduce the exhaust gas into the cylinder so that an EGR ratio which is a ratio between an amount of the exhaust gas to a total amount of a gas in the cylinder is a predetermined value.

The controller reduces the EGR ratio to be lower than the EGR ratio set in the compression ignition mode to switch the engine body operated in the spark ignition mode to a transitional mode in which the compression ignition combustion is performed before switching to the compression ignition mode.

According to this configuration, the EGR ratio in the transitional mode employed in switching from the spark ignition mode to the compression ignition mode is lower than the EGR ratio set in the compression ignition mode. This reduces the amount of the high temperature exhaust gas generated in the spark ignition mode and introduced into the cylinder before the switching of the combustion mode. Thus, the temperature in the cylinder is relatively reduced in the transitional mode. "Reducing the EGR ratio to be lower than the EGR ratio set in the compression ignition mode" includes reducing the EGR ratio to zero so as not to introduce the high temperature exhaust gas into the cylinder.

The compression ignition combustion is performed in the transitional mode. Since the temperature in the cylinder is low in the transitional mode, preignition of the air-fuel mixture in the cylinder is avoided, and the air-fuel mixture is compression-ignited at appropriate timing. Thus, the compression ignition combustion with high thermal efficiency is performed with the temperature in the cylinder kept low to reduce the temperature of the combustion gas and the temperature of the exhaust gas in the transitional mode.

In the compression ignition mode after the transitional mode, the EGR ratio is relatively high. Accordingly, a relatively large amount of the exhaust gas is introduced into the cylinder. As described above, the temperature of the exhaust gas has been reduced in the transitional mode. Therefore, the temperature in the cylinder does not excessively increase in the compression ignition mode. As a result, the preignition is avoided, and the air-fuel mixture is compression-ignited at appropriate timing also in the compression ignition mode. This avoids the increase in combustion noise in switching the engine body from the spark ignition combustion to the compression ignition combustion.

The exhaust returning apparatus may include an internal EGR regulator for regulating an amount of the exhaust gas remaining in the cylinder in a period from an exhaust stroke to an intake stroke, and the controller may make the internal EGR regulator inactive in the spark ignition mode and the transitional mode, and may activate the internal EGR regulator in the compression ignition mode.

The internal EGR regulator is inactive in the spark ignition mode. This avoids the excessive increase in temperature in the cylinder, and advantageously avoids the preignition and knocking. The internal EGR regulator is activated in the compression ignition mode. This increases the temperature in the cylinder, and improves ignitability and stability of the compression ignition combustion.

The internal EGR regulator is inactive in the transitional mode. Thus, the internal EGR regulator remains inactive in switching from the spark ignition mode to the transitional mode. This allows smooth mode switching. The high temperature exhaust gas is not introduced into the cylinder in the transitional mode. This avoids the preignition in the transitional mode, and effectively avoids the generation of the combustion noise.

The spark ignition engine may further include a valve mechanism configured to control operation of an intake valve and an exhaust valve, wherein the valve mechanism may perform a first valve operation of opening the exhaust valve in the exhaust stroke, and opening the intake valve in the intake stroke in the spark ignition mode, the valve mechanism, in addition to the first valve operation, may bring the exhaust valve in an open state at timing later than timing of closing the exhaust valve in the first valve operation, or may bring the intake valve in an open state at timing earlier than timing of opening the intake valve in the first valve operation in the compression ignition mode, and the valve mechanism may perform the first valve operation to operate the intake valve and the exhaust valve in the transitional mode.

In the compression ignition mode, in addition to the first valve operation in the spark ignition mode, the exhaust valve is in the open state at the timing later than the timing of closing the exhaust valve in the first valve operation. The exhaust valve is "in an open state" means that the exhaust valve which is opened in the exhaust stroke is kept open in the intake stroke (the exhaust valve is not closed), and that the exhaust valve which is opened in the exhaust stroke is once closed, and then reopened in the intake stroke. Keeping the exhaust valve which is opened in the exhaust valve in the open state in the intake stroke includes increasing a lift amount of the exhaust valve gradually decreased from a lift amount maximized in the exhaust stroke, and increasing a period in which the exhaust valve is open without increasing the maximized lift amount of the exhaust valve (e.g., maintaining the lift amount with respect to variation in crank angle, or reducing a ratio of reduction in lift amount). Thus, the exhaust valve can be opened in a way different from the first valve operation by using a cam shift mechanism for switching a plurality of cams having different cam characteristics. The cam shift mechanism is responsive to the switching of the valve, and is advantageous in controlling the switching of the combustion mode.

With the exhaust valve opened in the exhaust stroke and the intake stroke, part of the exhaust gas emitted from the cylinder to the exhaust side in the exhaust stroke is reintroduced into the cylinder when the exhaust valve is in the open state in the subsequent intake stroke. This increases the amount of the exhaust gas remaining in the cylinder in a period from the exhaust stroke to the intake stroke.

Likewise, in addition to the first valve operation in the spark ignition mode, the intake valve may be in an open state in the compression ignition mode at timing earlier than timing of opening the intake valve in the first valve operation. The intake valve is "in an open state" means the same as described above in connection with the exhaust valve.

In this configuration, the intake valve is in the open state in the exhaust stroke and the intake stroke. Thus, in the exhaust stroke, part of the exhaust gas is emitted from the cylinder to the intake side, and the exhaust gas is reintroduced into the cylinder when the intake valve is in the open state in the subsequent intake stroke. This also increases the amount of the exhaust gas remaining in the cylinder in the period from the exhaust stroke to the intake stroke.

In contrast to the valve operation in the compression ignition mode, the intake valve and the exhaust valve are operated by the first valve operation in the spark ignition mode in the transitional mode. Thus, the amount of the exhaust gas remaining in the cylinder in the period from the exhaust stroke to the intake stroke is ideally reduced to zero. Specifically, the EGR ratio in the transitional mode is reduced to be lower than the EGR ratio in the compression ignition mode.

In switching from the spark ignition mode to the compression ignition mode through the transitional mode, the valve mechanism may perform a first valve operation of opening the exhaust valve in the exhaust stroke, and opening the intake valve in the intake stroke in the spark ignition mode, the valve mechanism may perform a second valve operation of opening the intake valve for a shorter period than a period for opening the intake valve in the first valve operation in the transitional mode, and the valve mechanism may perform, in addition to the second valve operation, a third valve operation of bringing the exhaust valve in an open state at timing later than timing of closing the exhaust valve in the second valve operation in the compression ignition mode.

In this configuration, the vale system changes the operation of opening the intake valve in switching from the spark ignition mode to the transitional mode. Specifically, in contrast to the first valve operation of opening the exhaust valve in the exhaust stroke, and opening the intake valve in the intake stroke, the operation of opening the intake valve is changed to reduce the period in which the intake valve is open. The period in which the intake valve is open can be changed by a cam shift mechanism for switching a plurality of cams. The cam shift mechanism changes the period in which the intake valve is open with high responsiveness.

In switching from the transitional mode to the compression ignition mode, the valve mechanism changes the operation of opening the exhaust valve. Specifically, the exhaust valve opened in the exhaust stroke in the transitional mode is opened in the exhaust stroke and the intake stroke in the compression ignition mode. The switching of a lift characteristic of the valve can be achieved by the cam shift mechanism described above.

Thus, according to the above-described configuration, the valve mechanism changes the lift characteristic of the intake valve in switching the engine body from the spark ignition mode to the transitional mode, and then the valve mechanism changes the lift characteristic of the exhaust valve to switch the engine body from the transitional mode to the compression ignition mode. This enhances a response to the mode switching control, and is advantageous in smoothly switching from the spark ignition mode to the compression ignition mode.

In switching from the spark ignition mode to the compression ignition mode through the transitional mode, the valve mechanism may perform a first valve operation of opening the exhaust valve in the exhaust stroke, and opening the intake valve in the intake stroke in the spark ignition mode, the valve mechanism may perform a second valve operation of opening the exhaust valve for a shorter period than a period for opening the exhaust valve in the first valve operation in the transitional mode, and the valve mechanism may perform, in addition to the second valve operation, a third valve operation of bringing the intake valve in an open state at timing earlier than timing of opening the intake valve in the second valve operation in the compression mode.

In this configuration, in a reverse manner of the above-described manner, the valve mechanism changes the operation of opening the exhaust valve in switching from the spark ignition mode to the transitional mode, and changes the operation of opening the intake valve in switching from the transitional mode to the compression ignition mode. This configuration also enhances the response to the mode switching control, and is advantageous in smoothly switching from the spark ignition mode to the compression ignition mode.

The controller may switch the engine body from the compression ignition mode to the spark ignition mode without switching the engine body to the transitional mode.

In switching from the compression ignition mode to the spark ignition mode, the combustion noise accompanying the preignition is not generated. Thus, the compression ignition mode can directly be switched to the spark ignition mode without switching the engine body to the transitional mode. Skipping the transitional mode allows quick switching from the compression ignition mode to the spark ignition mode. In the case where the compression ignition mode is employed when the load of the engine body is relatively low, and the spark ignition mode is employed when the load of the engine body is relatively high, the engine body is switched from the compression ignition mode to the spark ignition mode in accordance with a driver's request for acceleration. Thus, the quick switching from the compression ignition mode to the spark ignition mode enhances a response to acceleration of the vehicle.

The spark ignition engine may further include a fuel injection valve configured to directly inject a fuel in the cylinder, wherein the controller controls the fuel injection valve to inject the fuel at timing after an intermediate stage of a compression stroke in accordance with temperature in the cylinder after the engine body is switched from the spark ignition mode to the transitional mode.

As described above, the occurrence of the preignition can be reduced by switching the engine body operated in the spark ignition mode to the transitional mode in which the EGR ratio is relatively reduced before switching to the compression ignition mode. However, the preignition may possibly occur in the transitional mode when the temperature in the cylinder is relatively high, e.g., when the temperature of an inner wall of the cylinder is relatively high, after the spark ignition mode is switched to the transitional mode.

The transitional mode may be continued to retard the timing of switching to the compression ignition mode until the temperature in the cylinder decreases. However, when the EGR ratio is kept relatively low for a long time, the temperature in the cylinder excessively decreases, and the compression ignition cannot stably be performed. Thus, although the engine body needs to be switched to the compression ignition mode for stable ignition, the preignition may possibly occur in the compression ignition mode due to the relatively high temperature of the inner wall of the cylinder.

Thus, in the transitional mode or the compression ignition mode, the fuel injection valve may inject the fuel at timing after the intermediate stage of the compression stroke in accordance with the temperature in the cylinder, e.g., when the temperate in the cylinder is higher than a predetermined temperature. The temperature in the cylinder decreases due to latent heat of vaporization of the fuel injected in the cylinder. Further, the timing of injecting the fuel is relatively retarded, and reactive time of the air-fuel mixture is reduced. Thus, the preignition can surely be avoided in the transitional mode or the compression ignition mode.

Advantages of the Invention

As described above, the spark ignition engine makes it possible to avoid increase in combustion noise in switching from the spark ignition mode to the compression ignition mode.

DESCRIPTION OF EMBODIMENTS

An embodiment of a spark ignition engine will be described with reference to the drawings. The following preferred embodiment is provided only for the illustration purpose.

(General Configuration of Engine)

Figure 1:
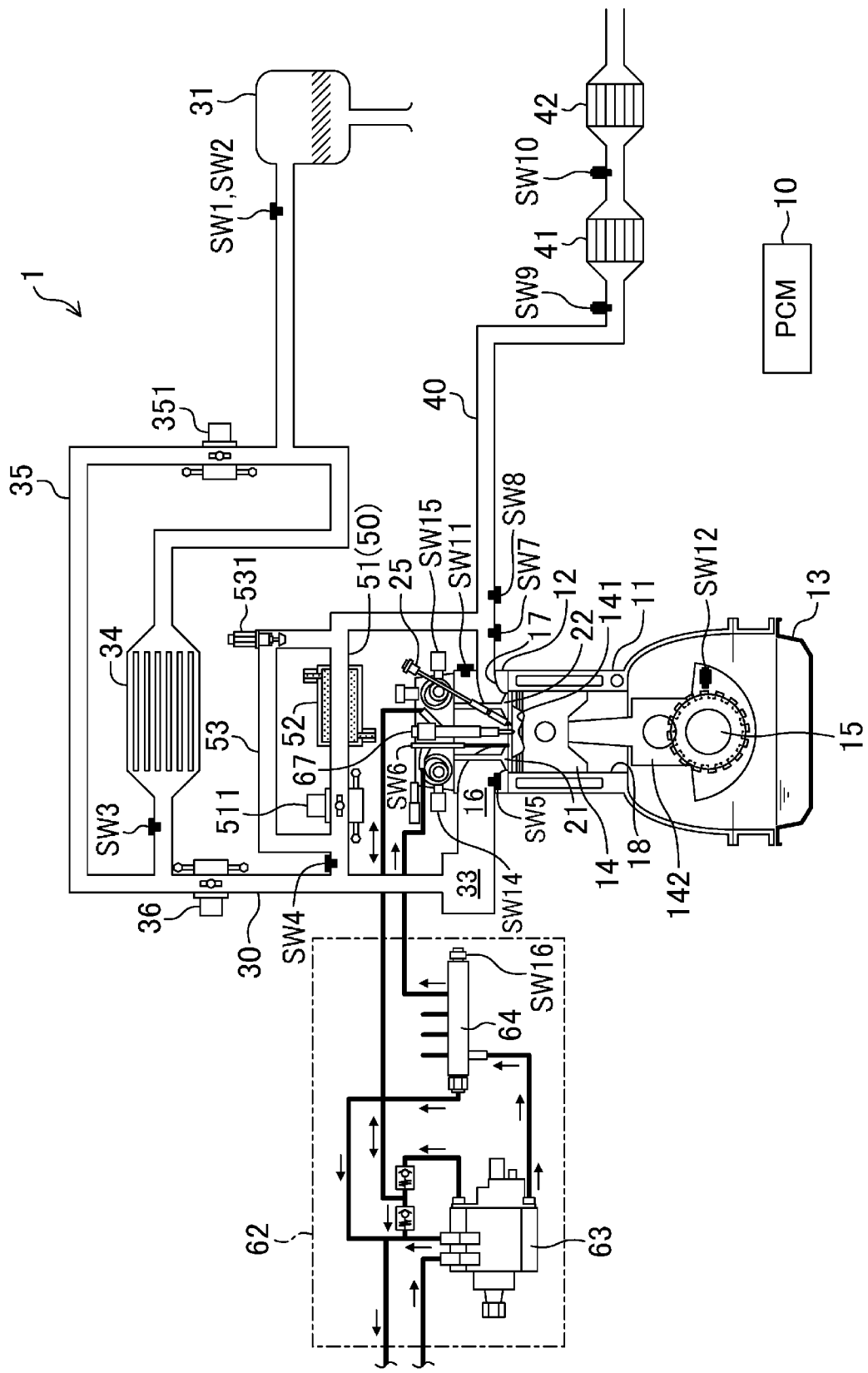
FIG. 1 is a schematic view showing a configuration of a spark ignition direction injection engine.
Figure 2:
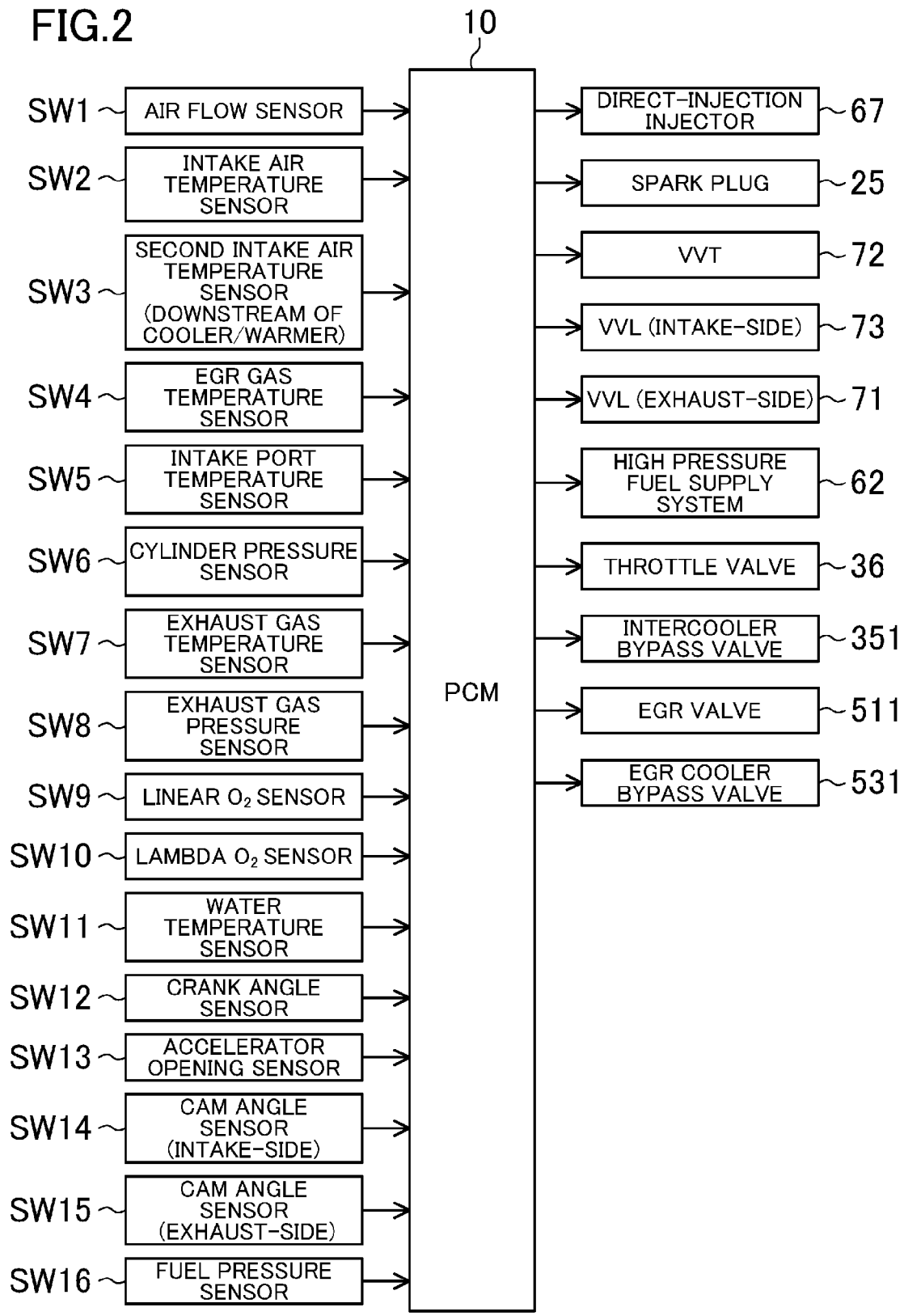
FIG. 2 is a block diagram related to control of the spark ignition direction injection engine.

FIGS. 1 and 2 show a schematic configuration of an engine (an engine body) 1. The engine 1 is a spark ignition gasoline engine mounted on a vehicle, and supplied with a fuel containing at least gasoline. The engine 1 includes a cylinder block 11, a cylinder head 12 arranged on the cylinder block 11, and an oil pan 13 arranged below the cylinder block 11. The cylinder block 11 is provided with a plurality of cylinders 18. FIG. 1 shows a single cylinder only, but the engine 1 includes four cylinders arranged in series, for example.

A piston 14 is reciprocatably fitted in each of the cylinders 18. The piston 14 is coupled to a crankshaft 15 through a connecting rod 142. As shown in an enlargement in FIG. 3, a cavity 141 like a re-entrant cavity of a diesel engine is formed in a top face of the piston 14. The cavity 141 faces an injector 67 described later when the piston 14 is located near a compression top dead center. The cylinder head 12, the cylinder 18, and the piston 14 having the cavity 141 define a combustion chamber 19. The shape of the combustion chamber 19 is not limited to the illustrated shape. The shapes of the cavity 141, the top face of the piston 14, a ceiling of the combustion chamber 19, etc. can be changed as appropriate.

The engine 1 has a relatively high geometric compression ratio of 15 or higher for improved theoretical thermal efficiency, stabilized compression ignition combustion described later, etc. The geometric combustion ratio may be set as appropriate within a range from 15 or higher to 20 or lower. For example, the geometric combustion ratio of the engine 1 is 18.

The cylinder head 12 has an intake port 16 and an exhaust port 17 formed for each of the cylinders 18. An intake valve 21 and an exhaust valve 22 are arranged in the intake port 16 and the exhaust port 17, respectively, to open/close openings near the combustion chamber 19.

A valve mechanism for driving the exhaust valve 22 includes, for example, a hydraulic variable mechanism (hereinafter referred to as a variable valve lift (VVL) mechanism, see FIG. 2) 71. The VVL 71 switches an operation mode of the exhaust valve 22 between a normal mode and a special mode. Although its configuration is not illustrated in detail, the VVL 71 on the exhaust side includes two different types of cams having different cam profiles, i.e., first and second cams, and a lost motion mechanism for selectively transmitting an operation state of one of the first cam or the second cam to the exhaust valve. The two different types of cams include the first cam having a single cam lobe and the second cam having two cam lobes. When the VVL 71 transmits the operation state of the first cam to the exhaust valve 22, the exhaust valve 22 is operated in the normal mode to be opened only once in an exhaust stroke. When the VVL 71 transmits the operation state of the second cam to the exhaust valve 22, the exhaust valve 22 is opened in the exhaust stroke and in an intake stroke. Specifically, the exhaust valve 22 is operated in the special mode to be opened twice (see FIG. 10, etc.). The exhaust-side VVL 71 switches the operation mode between the normal mode and the special mode in accordance with the operation state of the engine 1. Specifically, the special mode is used in controlling internal EGR. In the following description, operating the exhaust-side VVL 71 in the normal mode so as not to open the exhaust valve 22 twice may be referred to as "turn the VVL 71 off," and operating the exhaust-side VVL 71 in the special mode to open the exhaust valve 22 twice may be referred to as "turn the VVL 71 on." For the switching between the normal mode and the special mode, an electromagnetic valve mechanism for driving the exhaust valve 22 using an electromagnetic actuator may be employed. The internal EGR is performed not only by opening the exhaust valve 22 twice. For example, the internal EGR may be controlled by opening the intake valve 21 twice. The internal EGR may be controlled by leaving burnt gas in the cylinder 18 by setting a negative overlap period in which both of the intake valve 21 and the exhaust valve 22 are closed in the exhaust and intake strokes.

Figure 10:
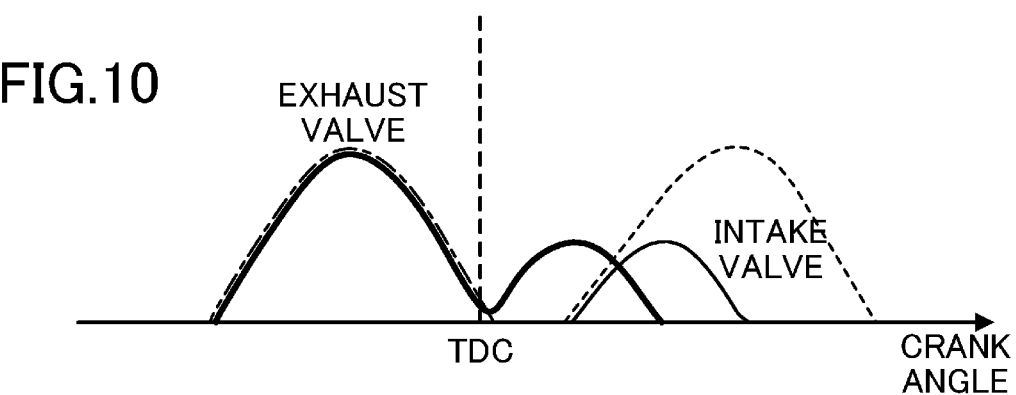
FIG. 10 is a view illustrating lift amounts of an intake valve and an exhaust valve associated with the exhaust valve opened twice.

A valve mechanism for driving the intake valve 21 also includes a VVL 73 like the exhaust valve mechanism including the VVL 71. The intake-side VVL 73 is different from the exhaust-side VVL 71. The intake-side VVL 73 includes two different types of cams having different cam profiles, i.e., a large lift cam which relatively increases a lift amount of the intake valve 21, and a small lift cam which relatively decreases the lift amount of the intake valve 21, and a lost motion mechanism for selectively transmitting an operation state of one of the large lift cam or the small lift cam to the intake valve 21. As shown in FIG. 10, etc., when the intake-side VVL 73 transmits the operation state of the large lift cam to the intake valve 21, the intake valve 21 is opened with a relatively large lift amount for a long opening time. When the intake-side VVL 73 transmits the operation state of the small lift cam to the intake valve 21, the intake valve 21 is opened with a relatively small lift amount for a short opening time. The intake-side valve mechanism further includes a phase variable mechanism (hereinafter referred to as a variable valve timing (VVT) mechanism) 72 as shown in FIG. 2. The VVT 72 changes a rotation phase of an intake camshaft relative to the crankshaft 15. The VVT 72 may have a known hydraulic, electromagnetic, or mechanical configuration as appropriate, and details thereof are not shown in the drawings. The VVT 72 and the VVL 73 can change timings of opening and closing the intake valve 21, and the lift amount of the intake valve 21.

The cylinder head 12 is further provided with injectors 67 for directly injecting the fuel in the cylinders 18, respectively. As shown in the enlargement in FIG. 3, each of the injectors 67 is arranged with its nozzle facing the inside of the combustion chamber 19 from a center of a ceiling of the combustion chamber 19. The injector 67 directly injects the fuel in an amount in accordance with the operation state of the engine at injection timing determined in accordance with the operation state of the engine 1. In the illustrated example, the injector 67 is a multi-hole injector having a plurality of nozzles. Thus, the injector 67 injects the fuel such that the fuel is radially sprayed from the center of the combustion chamber 19. As indicated by arrows in FIG. 3, the fuel radially sprayed from the center of the combustion chamber 19 when the piston 14 is located near the compression top dead center flows along a wall surface of the cavity 141 formed in the top face of the piston. In other words, the cavity 141 is shaped to contain the fuel sprayed when the piston 14 is located near the compression top dead center. A combination of the multi-hole injector 67 and the cavity 141 is advantageous in shortening a period for forming the air-fuel mixture after the spraying of the fuel, and shortening a combustion period. The injector 67 is not limited to the multi-hole injector, and an injector having an outward lifting valve may be used.

A fuel tank not shown in the drawings and the injector 67 are connected by a fuel supply passage. A fuel supply system 62 is provided in the fuel supply passage. The fuel supply system 62 includes a fuel pump 63 and a common rail 64, and can supply the fuel to the injector 67 at a relatively high fuel pressure. The fuel pump 63 pumps the fuel from the fuel tank to the common rail 64. The common rail 64 stores the pumped fuel at a relatively high fuel pressure. The injector 67 injects the fuel stored in the common rail 64 from the nozzle. Although not shown, the fuel pump 63 is a plunger pump, and is driven by the engine 1. The fuel supply system 62 including the engine-driven pump can supply the fuel at a high fuel pressure of 30 MPa or higher to the injector 67. The fuel pressure may be set to about 120 MPa at the maximum. The pressure of the fuel supplied to the injector 67 is varied in accordance with the operation state of the engine 1. The fuel supply system 62 is not limited to this configuration.

Figure 3:
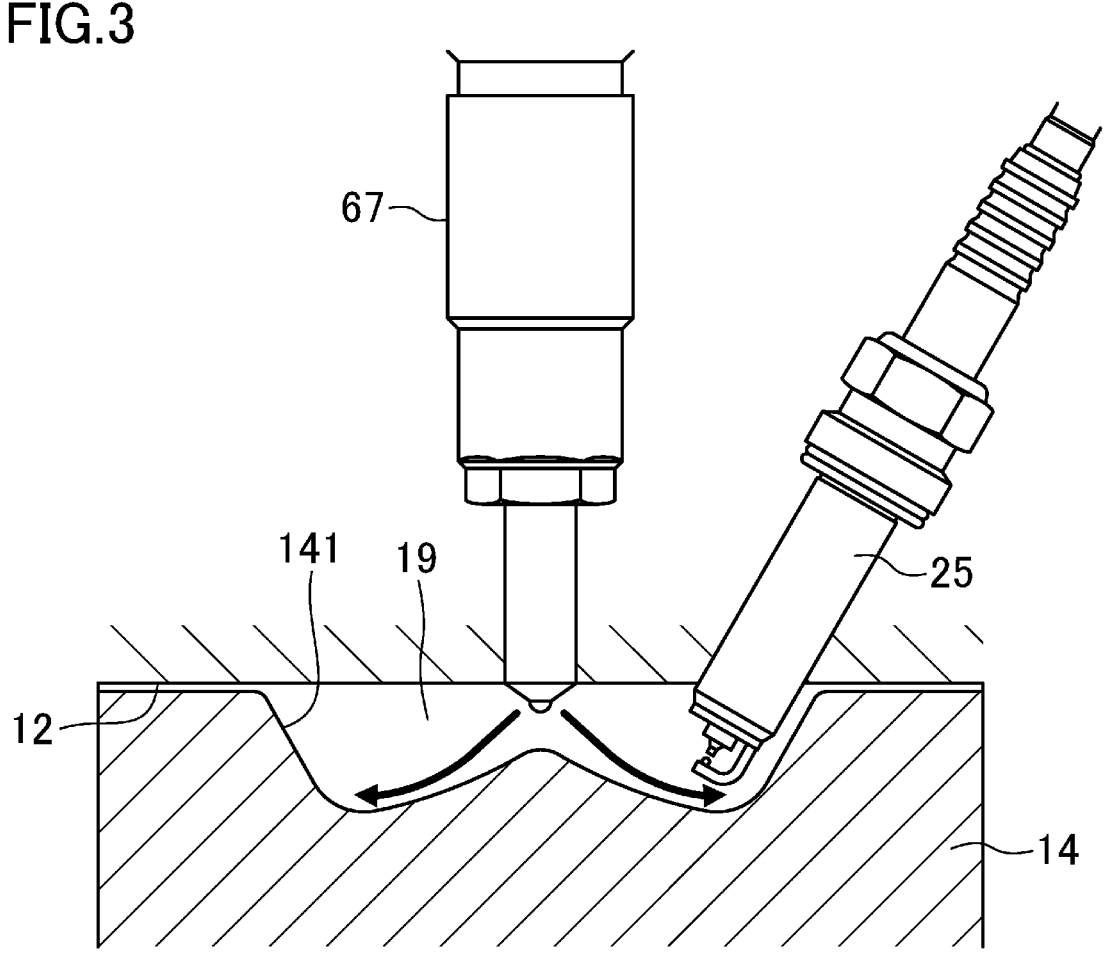
FIG. 3 is an enlarged cross-sectional view showing a combustion chamber.

As shown in FIG. 3, the cylinder head 12 further includes a spark plug 25 for igniting the air-fuel mixture in the combustion chamber 19. In this example, the spark plug 25 penetrates the cylinder head 12 to extend obliquely downward from the exhaust side of the engine 1. As shown in FIG. 3, a tip of the spark plug 25 is disposed in the cavity 141 of the piston 14 located at the compression top dead center.

An intake air passage 30 is connected to one side surface of the engine 1 as shown in FIG. 1. The intake air passage 30 communicates with the intake port 16 of each of the cylinders 18. An exhaust air passage 40 is connected to the other side surface of the engine 1. The exhaust air passage 40 emits the burnt gas (exhaust gas) from the combustion chamber 19 of each of the cylinders 18.

An air cleaner 31 for filtering intake air is disposed at an upstream end of the intake air passage 30. A surge tank 33 is disposed near a downstream end of the intake air passage 30. Part of the intake air passage 30 downstream of the surge tank 33 is divided into independent passages corresponding to the cylinders 18. Downstream ends of the independent passages are connected to the intake ports 16 of the cylinders 18.

An intercooler/warmer 34 and a throttle valve 36 are disposed in the intake air passage 30 between the air cleaner 31 and the surge tank 33. The intercooler/warmer 34 is a water-cooling cooler, for example. The intercooler/warmer 34 cools or heats the air. The throttle valve 36 regulates an amount of the intake air supplied to each of the cylinders 18. An intercooler bypass passage 35 for bypassing the intercooler/warmer 34 is connected to the intake air passage 30. The intercooler bypass passage 35 is provided with an intercooler bypass valve 351. The intercooler bypass valve 351 regulates a flow rate of the air passing through the intercooler bypass passage 35. Adjusting the degree of opening of the intercooler bypass valve 351 adjusts a ratio between the flow rate of the air passing through the intercooler bypass passage 35 and the flow rate of the air passing through the intercooler/warmer 34. This makes it possible to regulate the temperature of fresh air introduced into the cylinders 18.

An upstream part of the exhaust air passage 40 is constituted of an exhaust manifold. The exhaust manifold includes independent passages for the cylinders 18 connected to outer ends of the exhaust ports 17, and an assembly part in which the independent passages are gathered. As an exhaust emission purifier for purifying hazardous components in the exhaust gas, a direct catalyst 41 and an underfoot catalyst 42 are connected to part of the exhaust air passage 40 downstream of the exhaust manifold. Each of the direct catalyst 41 and the underfoot catalyst 42 includes a tubular case, and a three-way catalyst disposed in a passage in the case, for example.

Part of the intake air passage 30 between the surge tank 33 and the throttle valve 36 is connected to part of the exhaust air passage 40 upstream of the direct catalyst 41 through an EGR passage 50. The EGR passage 50 returns part of the exhaust gas to the intake air passage 30. The EGR passage 50 includes a main passage 51 in which an EGR cooler 52 is disposed, and an EGR cooler bypass passage 53 for bypassing the EGR cooler 52. The EGR cooler 52 cools the exhaust gas with engine cooling water. The main passage 51 is provided with an EGR valve 511. The EGR valve 511 regulates an amount of the exhaust gas returned to the intake air passage 30. The EGR cooler bypass passage 53 is provided with an EGR cooler bypass valve 531. The EGR cooler bypass valve 531 regulates a flow rate of the exhaust gas circulating through the EGR cooler bypass passage 53.

The engine 1 is controlled by a powertrain control module (hereinafter referred to as PCM) 10. The PCM 10 is a microprocessor including a CPU, a memory, a counter timer group, an interface, and paths connecting these units. The PCM 10 constitutes a controller.

As shown in FIGS. 1 and 2, the PCM 10 receives detection signals from various sensors SW1-SW16. The various sensors include the following sensors. Specifically, an air flow sensor SW1 and an intake air temperature sensor SW2 are arranged downstream of the air cleaner 31 to detect the flow rate and the temperature of the fresh air, respectively. A second intake air temperature sensor SW3 is arranged downstream of the intercooler/warmer 34 to detect the temperature of the fresh air passed through the intercooler/warmer 34. An EGR gas temperature sensor SW4 is arranged near a junction between the EGR passage 50 and the intake air passage 30 to detect the temperature of external EGR gas. An intake port temperature sensor SW5 is attached to the intake port 16 to detect the temperature of the intake air immediately before flowing into the cylinder 18. A cylinder pressure sensor SW6 is attached to the cylinder head 12 to detect the pressure in the cylinder 18. An exhaust gas temperature sensor SW7 and an exhaust gas pressure sensor SW8 are arranged near a junction between the exhaust air passage 40 and the EGR passage 50 to detect the temperature and the pressure of the exhaust gas, respectively. A linear $O_2$ sensor SW9 is arranged upstream of the direct catalyst 41 to detect a concentration of oxygen in the exhaust gas. A lambda $O_2$ sensor SW10 is arranged between the direct catalyst 41 and the underfoot catalyst 42 to detect the concentration of oxygen in the exhaust gas. A water temperature sensor SW11 detects the temperature of the engine cooling water. A crank angle sensor SW12 detects a rotation angle of the crankshaft 15. An accelerator opening sensor SW13 detects a degree of opening of an accelerator corresponding to a position of an accelerator pedal (not shown) of the vehicle. A cam sensor SW14 is provided on the exhaust side, and a cam sensor SW15 is provided on the intake side. A fuel pressure sensor SW16 is attached to the common rail 64 of the fuel supply system 62 to detect the pressure of the fuel supplied to the injector 67.

The PCM 10 performs various types of calculation based on these detection signals to determine the conditions of the engine 1 and the vehicle. In accordance with the results of the determination, the PCM 10 outputs control signals to actuators of the injector 67, the spark plug 25, the VVT 72, the intake-side VVL 73, the exhaust-side VVL 71, the fuel supply system 62, and the valves (the throttle valve 36, the intercooler bypass valve 351, the EGR valve 511, and the EGR cooler bypass valve 531). The PCM 10 operates the engine 1 in this way.

(Operation Range of Engine)

Figure 4:
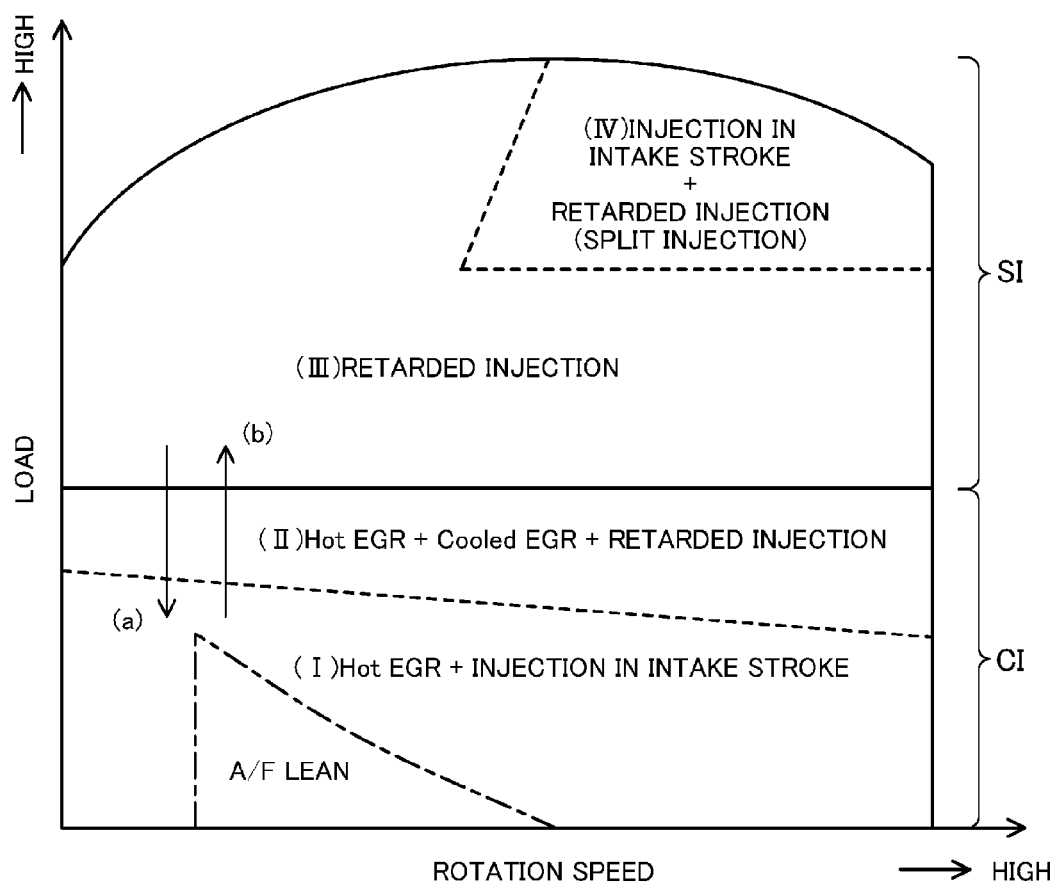
FIG. 4 is a view illustrating an operation range of an engine.

FIG. 4 shows an example operation range of the engine 1 in a warm state. For enhanced fuel efficiency and improved exhaust emission performance, the engine 1 does not perform ignition with the spark plug 25, but performs compression ignition by compression auto-ignition in a low load range where the engine has a relatively low load. However, with an increase in load of the engine 1, the compression ignition combustion proceeds too rapidly to cause problems, such as combustion noise. Thus, the engine 1 does not perform the compression ignition combustion, and performs the spark ignition combustion using the spark plug 25 in a high load range where the engine has a relatively high load. The PCM 10 switches an ignition mode between a compression ignition (CI) mode in which the compression ignition combustion is performed, and a spark ignition (SI) mode in which the spark ignition combustion is performed in accordance with the operation state of the engine 1, particularly in accordance with the level of the load of the engine 1. A boundary between the modes is not limited to the illustrated boundary. The PCM 10 may perform the mode switching in accordance with various situations described later in addition to the level of the load.

Figure 5A:
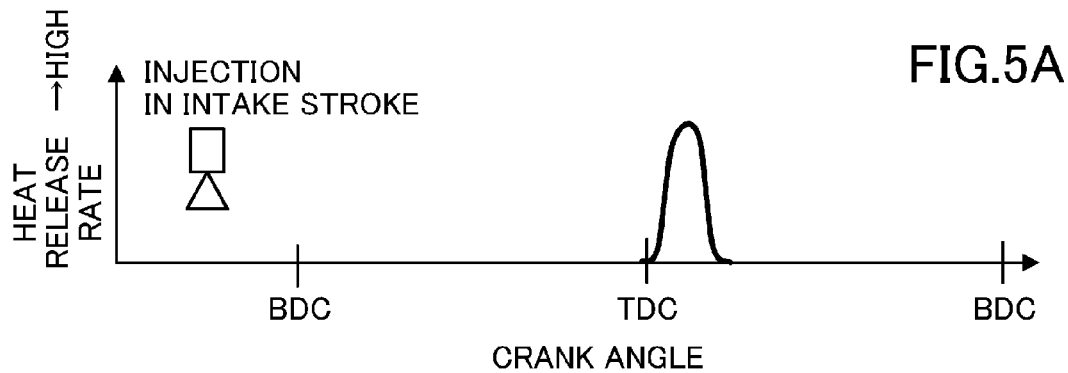
FIG. 5A shows an example of timing of fuel injection performed in an intake stroke in a CI mode, and a heat release rate in CI combustion accompanying the fuel injection.

As shown in FIG. 4, an operation range in the CI mode is divided into two ranges in accordance with the level of the load of the engine. In a range (I) where the load is low or medium in the operation range in the CI mode, the PCM 10 introduces hot EGR gas at relatively high temperature into the cylinder 18 to enhance ignitability and stability of the compression ignition combustion. Specifically, the PCM 10 turns the exhaust-side VVL 71 on to open the exhaust valve 22 twice in the exhaust stroke and the intake stroke. Introducing the hot EGR gas increases the compression end temperature in the cylinder 18, and enhances the ignitability and the stability of the compression ignition combustion in the range (I). In the range (I), as shown in FIG. 5A, the injector 67 injects the fuel in the cylinder 18 at least in a period from the intake stroke to an intermediate stage of a compression stroke. Thus, a homogeneous air-fuel mixture is formed in the cylinder 18. In the range (I), an air-fuel ratio (A/F) of the air-fuel mixture is basically a theoretical air-fuel ratio (A/F=14.7±0.5, an excess air ratio: $\lambda \approx 1$). As indicated by a dot-and-dash line in FIG. 4, the air-fuel mixture shows the A/F lean of the theoretical air-fuel ratio in part of the range (I) where the load is relatively low and an engine speed is relatively low.

In the range (I), the PCM 10 makes the spark plug 25 inactive. As shown in FIG. 5A, compression auto-ignition of the air-fuel mixture in the chamber 19 occurs near the compression top dead center.

In the operation range in the CI mode, the A/F of the air-fuel mixture is the theoretical air-fuel ratio ($\lambda \approx 1$) in a range (II) where the load is higher than the load in the range (I). Thus, a three-way catalyst can be used. As described later, the A/F of the air-fuel mixture is the theoretical air-fuel ratio also in an operation range in the SI mode. Thus, in the range (II), the A/F of the air-fuel mixture being the theoretical air-fuel ratio contributes to simplification of the control in switching the ignition mode between the SI mode and the CI mode, and expansion of the operation range in the CI mode toward the high load range.

The temperature in the cylinder spontaneously increases with the increase in load of the engine. Thus, the PCM 10 reduces the amount of the hot EGR gas to avoid preignition in the range (II). The amount of the hot EGR gas is adjusted by adjusting an amount of internal EGR gas introduced into the cylinder 18. The amount of the hot EGR gas can be adjusted by adjusting an amount of the external EGR gas bypassed the EGR cooler 52.

In the range (II), the PCM 10 introduces cooled EGR gas at relatively low temperature into the cylinder 18. Thus, the high temperature hot EGR gas and the low temperature cooled EGR gas are introduced into the cylinder 18 in an appropriate ratio. This optimizes the compression end temperature in the cylinder 18, avoids rapid combustion while ensuring the ignitability of the compression ignition, and stabilizes the compression ignition combustion.

Figure 5B:
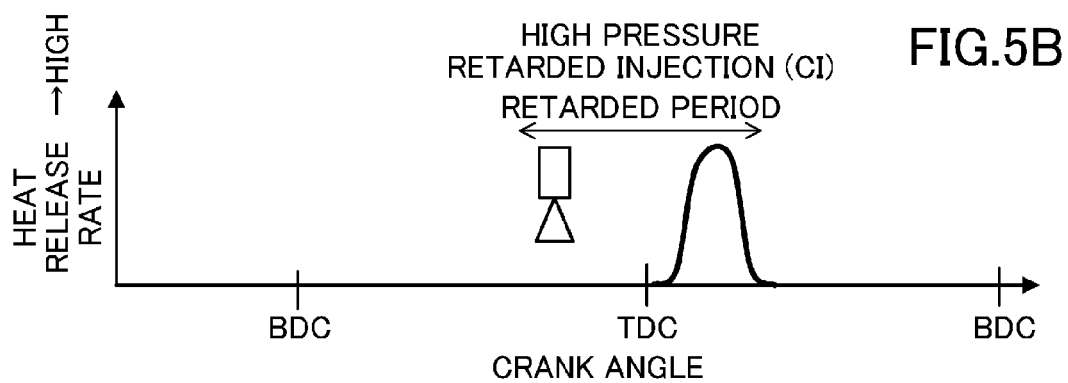
FIG. 5B shows an example of timing of high pressure retarded injection performed in the CI mode, and the heat release rate in the CI combustion accompanying the high pressure retarded injection.

Thus, the PCM 10 is supposed to decrease the temperature in the cylinder 18 in the range (II) including the boundary between the CI mode and the SI mode. Nevertheless, the compression end temperature in the cylinder 18 may possibly increase. Accordingly, when the fuel is injected in the cylinder 18 in a period from the intake stroke to the intermediate stage of the compression stroke in the range (II), abnormal combustion, such as preignition, etc., may possibly occur. When a large amount of the low temperature cooled EGR gas is introduced to decrease the compression end temperature in the cylinder to avoid the preignition, the ignitability of the compression ignition may deteriorate in turn. Specifically, in the range (II), the compression ignition combustion cannot stably be performed simply by controlling the temperature in the cylinder 18. Thus, in the range (II), the PCM 10 performs creative fuel injection in addition to the control of the temperature in the cylinder 18, thereby avoiding the abnormal combustion such as preignition, etc., and stabilizing the compression ignition combustion. Specifically, in the creative fuel injection, the fuel at a significantly increased pressure as compared with a conventionally employed pressure is injected in the cylinder 18 at least in a period from a terminal stage of the compression stroke to an initial stage of an expansion stroke (hereinafter the period is referred to as a retarded period) as shown in FIG. 5B. This distinctive fuel injection is hereinafter referred to as "high pressure retarded injection" or simply "retarded injection." The high pressure retarded injection makes it possible to avoid the abnormal combustion in the range (II), and to stabilize the compression ignition combustion. Details of the high pressure retarded injection will be described later.

While the operation range in the CI mode is divided into the two ranges in accordance with the level of the load of the engine, the operation range in the SI mode is divided into two ranges, i.e., a range (III) and a range (IV), roughly in accordance with the level of an engine speed. In the illustrated example, suppose that the operation range of the engine 1 is divided into a low speed range and a high speed range, the range (III) corresponds to a low speed range and a low load part in the high speed range, and the range (IV) corresponds to a high load part in the high speed range. A boundary between the range (III) and the range (IV) is not limited to the illustrated boundary.

In each of the range (III) and the range (IV), the A/F of the air-fuel mixture is the theoretical air-fuel ratio ($\lambda \approx 1$) like the A/F in the range (II). Thus, the A/F of the air-fuel mixture is constant at the theoretical air-fuel ratio ($\lambda \approx 1$) across the boundary between the CI mode and the SI mode. In the SI mode (i.e., in the range (III) and the range (IV)), the PCM 10 basically fully opens the throttle valve 36, and adjusts the degree of opening of the EGR valve 511. Thus, the PCM 10 adjusts a ratio of an amount of fresh air introduced into the cylinder 18 and an amount of the external EGR gas. Also in the operation range in the SI mode, the PCM 10 may reduce the degree of opening of the throttle valve 36 in a range where the load is relatively low. Adjusting the amount of the fresh air by adjusting the ratio of the gas introduced into the cylinder 18 reduces pump losses. Further, introducing a large amount of the EGR gas into the cylinder 18 keeps the combustion temperature in the spark ignition combustion low, thereby reducing cooling losses. In the operation range in the SI mode, the PCM 10 introduces the external EGR gas which is cooled mainly by the EGR cooler 52 into the cylinder 18. This is advantageous in avoiding the abnormal combustion, and in reducing generation of raw NOx. In a full open load range, the PCM 10 closes the EGR valve 511 to reduce the amount of the external EGR gas to zero.

In the SI mode range, the PCM 10 stops introducing the EGR gas, and controls the degree of opening of the throttle valve 36 in accordance with the amount of the fuel injected by the injector 67 to adjust the amount of the fresh air introduced into the cylinder 18 such that the air-fuel mixture has the theoretical air-fuel ratio ($\lambda \approx 1$).

The geometric compression ratio of the engine 1 is set to 15 or higher (e.g., 18) as described above. A high compression ratio increases the compression end temperature and the compression end pressure. Thus, particularly in the low load range in the CI mode range (e.g., the range (I)), the engine 1 with the high compression ratio advantageously stabilizes the compression ignition combustion. On the other hand, the engine 1 with the high compression ratio may easily cause the abnormal combustion, such as preignition, knocking, etc., in the SI mode range which is a high load range.

Figure 5C:
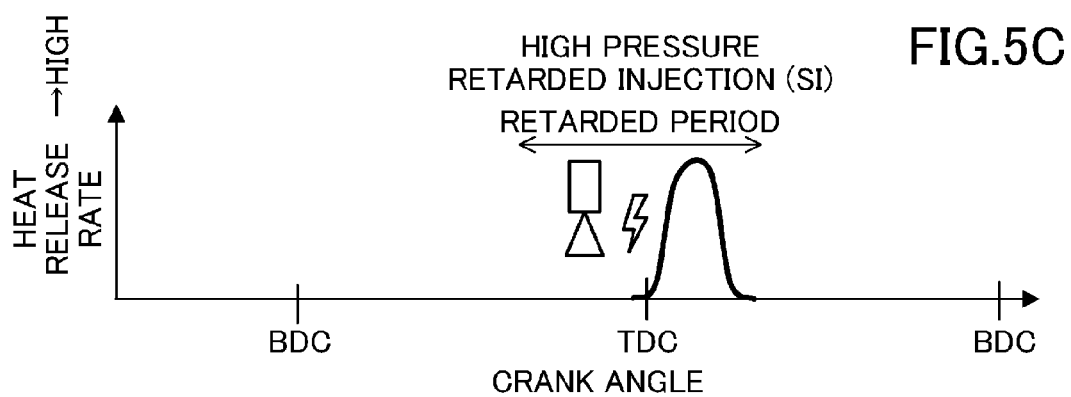
FIG. 5C shows an example of timing of the high pressure retarded injection performed in a SI mode and timing of ignition, and the heat release rate in SI combustion accompanying the high pressure retarded injection.
Figure 5D:
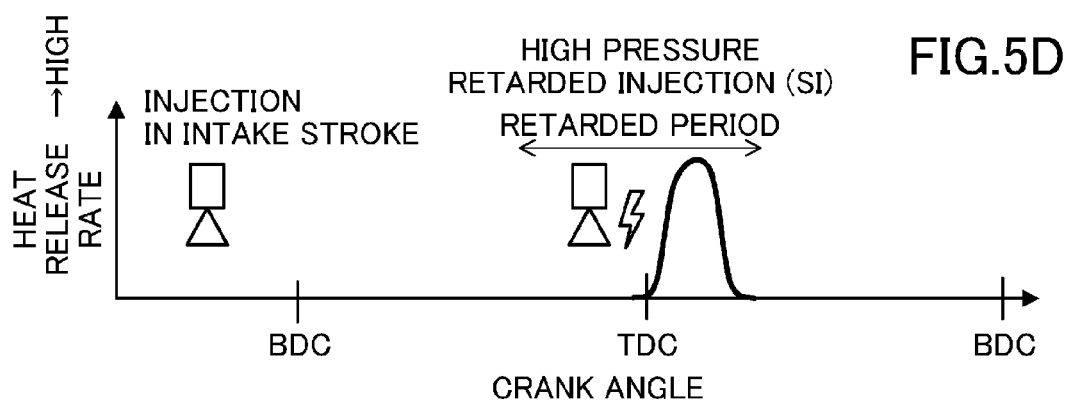
FIG. 5D shows an example of timing of split injection including the injection in the intake stroke and the high pressure retarded injection and timing of ignition, and the heat release rate in the SI combustion accompanying the split injection.

Thus, the PCM 10 performs the above-described high pressure retarded injection in the range (III) and the range (IV) in the SI mode to avoid the abnormal combustion. More specifically, in the range (III), the injector 67 injects the fuel in the cylinder 18 at a high fuel pressure of 30 MPa or higher in the retarded period from the terminal stage of compression stroke to the initial stage of the expansion stroke as shown in FIG. 5C. The injector 67 performs only the high pressure retarded injection in the range (III). In the range (IV), as shown in FIG. 5D, the injector 67 injects part of the fuel in the cylinder 18 in a period of the intake stroke in which the intake valve 21 is open, and injects the remaining fuel in the cylinder 18 in the retarded period. That is, the injector 67 performs split fuel injection in the range (IV). The "period of the intake stroke in which the intake valve 21 is open" is a period defined not based on the position of the piston, but based on the opening/closing state of the intake valve 21. Thus, timing when the "intake stroke" finishes may differ from timing when the piston reaches an intake bottom dead center in accordance with timing of closing the intake valve 21, which is changed by the VVL 73 or the VVT 72.

Figure 6:
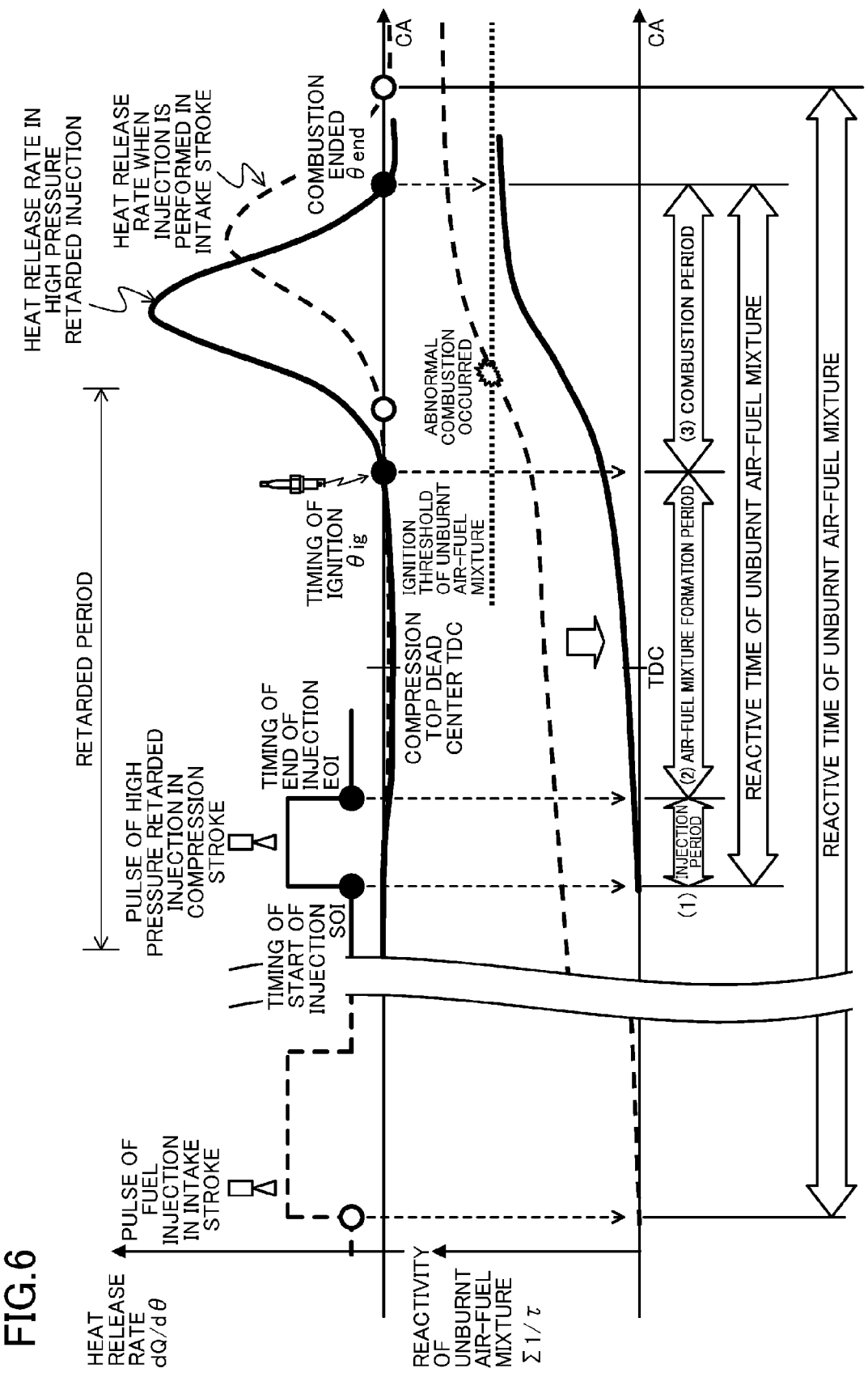
FIG. 6 is a view showing comparison between SI combustion by the high pressure retarded injection and conventional SI combustion.

Referring to FIG. 6, the high pressure retarded injection in the SI mode will be described below. FIG. 6 is a graph showing a comparison between SI combustion by the above-described high pressure retarded injection (indicated by a solid line) and conventional SI combustion by injecting the fuel in the period of the intake stroke (indicated by a broken line) in terms of a heat release rate (an upper portion of the graph) and reactivity of an unburnt air-fuel mixture (a lower portion of the graph). In FIG. 6, a horizontal axis represents a crank angle. The comparison is based on the assumption that the operation state of the engine 1 is in a high-load, low-speed range (i.e., the range (III)), and the same amount of fuel is injected in the SI combustion by the high pressure retarded injection and in the conventional SI combustion.

In the conventional SI combustion, the injector 67 injects a predetermined amount of the fuel in the cylinder 18 in the period of the intake stroke (indicated by a broken line in the upper portion of the graph). In the cylinder 18, a relatively homogeneous air-fuel mixture is formed before the piston 14 reaches the compression top dead center after the fuel injection. In the illustrated example, the spark plug 25 ignites the air-fuel mixture in the cylinder 18 at predetermined timing indicated by an open circle after the compression top dead center to start the combustion. After the start of the combustion, the heat release rate reaches its peak, and then the combustion finishes as indicated by the broken line in the upper portion of the graph of FIG. 6. A period from the start of the fuel injection to the end of the combustion corresponds to reactive time of the unburnt air-fuel mixture (hereinafter may simply be referred to as reactive time). As indicated by a broken line in the lower portion of the graph of FIG. 6, the reaction of the unburnt air-fuel mixture gradually proceeds for the reactive time. A dotted line in FIG. 6 indicates an ignition threshold of the reactivity of the unburnt air-fuel mixture at which the unburnt air-fuel mixture is ignited. Since the conventional SI combustion is performed in the low speed range, the reactive time is very long, for which the reaction of the unburnt air-fuel mixture continues. Thus, in the conventional SI combustion, the reactivity of the unburnt air-fuel mixture exceeds the ignition threshold before and after the ignition, thereby causing the abnormal combustion, such as preignition, knocking, etc.

On the other hand, the high pressure retarded injection is intended to avoid the abnormal combustion by reducing the reactive time. Specifically, as shown in FIG. 6, the reactive time is a sum of a period for which the injector 67 injects the fuel (i.e., (1) an injection period), a period from when the injection finishes to when a burnable air-fuel mixture is formed around the spark plug 25 (i.e., (2) an air-fuel mixture formation period), and a period until the combustion started by the ignition finishes (i.e., (3) a combustion period), that is, (1)+(2)+(3). The high pressure retarded injection reduces each of the injection period, the air-fuel mixture formation period, and the combustion period to reduce the reactive time. This will be described in detail below.

A high fuel pressure relatively increases the amount of the fuel injected by the injector 67 per unit time. Thus, when the amount of the injected fuel is kept constant, the fuel pressure and the fuel injection period roughly establish a relationship in which the injection period increases with decrease in fuel pressure, i.e., the injection period decreases with increase in fuel pressure. Therefore, the high pressure retarded injection in which the fuel pressure is set significantly higher than the conventional fuel pressure reduces the injection period.

The high fuel pressure advantageously atomizes the fuel sprayed in the cylinder 18, and increases a flight distance of the sprayed fuel. Thus, the fuel pressure and fuel evaporation time roughly establish a relationship in which the fuel evaporation time increases with the decrease in fuel pressure, i.e., the fuel evaporation time decreases with the increase in fuel pressure. Further, the fuel pressure and time taken until the sprayed fuel reaches the vicinity of the spark plug 25 roughly establish a relationship in which the time increases with the decrease in fuel pressure, i.e., the time decreases with the increase in fuel pressure. Since the air-fuel mixture formation period is a sum of the fuel evaporation time and the time taken until the sprayed fuel reaches the vicinity of the spark plug 25, the air-fuel mixture formation period decreases with the increase in fuel pressure. Therefore, the high pressure retarded injection in which the fuel pressure is set significantly higher than the conventional fuel pressure reduces the fuel evaporation time and the time taken until the sprayed fuel reaches the vicinity of the spark plug 25, thereby reducing the air-fuel mixture formation period. By contrast, as indicated by open circles in FIG. 6, the conventional fuel injection at a low fuel pressure in the intake stroke significantly increases the air-fuel mixture formation period. In the SI mode, the above-described combination of the multi-hole injector 67 and the cavity 141 reduces the time taken until the sprayed fuel reaches the vicinity of the spark plug 25 after the fuel injection, thereby advantageously reducing the air-fuel mixture formation period.

Reducing the injection period and the air-fuel mixture formation period makes it possible to relatively retard the timing of the fuel injection, more precisely, the timing of the start of the injection. In the high pressure retarded injection, the fuel is injected in the cylinder 18 in the retarded period from the terminal stage of the compression stroke to the initial stage of the expansion stroke as shown in the upper portion of the graph of FIG. 6. Since the fuel is injected in the cylinder 18 at the high fuel pressure, turbulence in the cylinder increases, and turbulence energy increases in the cylinder 18. The high turbulence energy advantageously reduces the combustion period in combination with the relatively retarded timing of the fuel injection.

Specifically, when the fuel is injected in the retarded period, the fuel pressure and the turbulence energy in the combustion period roughly establish a relationship in which the turbulence energy decreases with the decrease in fuel pressure, i.e., the turbulence energy increases with the increase in fuel pressure. Suppose that the fuel is injected in the cylinder 18 at high fuel pressure in the period of the intake stroke, the turbulence in the cylinder 18 is reduced because it takes a long time until the air-fuel mixture is ignited after the start of the injection, and the inside of the cylinder 18 is compressed in the compression stroke after the intake stroke. As a result, when the fuel is injected in the period of the intake stroke, the turbulence energy in the combustion period relatively decreases, irrespective of the level of the fuel pressure.

The turbulence energy in the combustion period and the combustion period roughly establish a relationship in which the combustion period increases with decrease in turbulence energy, i.e., the combustion period decreases with increase in turbulence energy. Accordingly, the fuel pressure and the combustion period establish a relationship in which the combustion period increases with the decrease in fuel pressure, i.e., the combustion period decreases with the increase in fuel pressure. Specifically, the high pressure retarded injection reduces the combustion period. By contrast, the conventional fuel injection at low fuel pressure in the intake stroke increases the combustion period. The multi-hole injector 67 advantageously increases the turbulence energy in the cylinder 18, and advantageously reduces the combustion period. Further, combining the multi-hole injector 67 and the cavity 141 to contain the sprayed fuel in the cavity 141 is also advantageous in reducing the combustion period.

As described above, the high pressure retarded injection reduces each of the injection period, the air-fuel mixture formation period, and the combustion period. As a result, as shown in FIG. 6, the reactive time of the unburnt air-fuel mixture from the start of the fuel injection SOI to the end of the combustion $\theta$end is significantly reduced as compared with the case where the conventional fuel injection is performed in the period of the intake stroke. In the conventional fuel injection performed at the low fuel pressure in the intake stroke, the reactivity of the unburnt air-fuel mixture at the end of the combustion exceeds the ignition threshold indicated by an open circle in the upper portion of the graph of FIG. 6, thereby causing the abnormal combustion. On the other hand, the high pressure retarded injection reduces the reactive time, thereby slowing the reaction of the unburnt air-fuel mixture at the end of the combustion, and avoiding the abnormal combustion as indicated by a solid circle. In the injection indicated by the open and solid circles in the upper portion of the graph of FIG. 6, the air-fuel mixture is ignited at the same time.

The fuel pressure set to 30 MPa or higher, for example, can effectively reduce the combustion period. The fuel pressure of 30 MPa or higher can effectively reduce both of the injection period and the air-fuel mixture formation period. The fuel pressure is preferably set as appropriate in accordance with the properties of the fuel used containing at least gasoline. An upper limit of the fuel pressure may be 120 MPa, for example.

The high pressure retarded injection avoids the occurrence of the abnormal combustion in the SI mode by devising the fuel injection in the cylinder 18. As contrasted with this fuel injection, retarding the timing of the ignition for avoiding the abnormal combustion has been known. The retardation of the ignition timing slows the reaction of the unburnt air-fuel mixture by reducing the increase in temperature and pressure of the unburnt air-fuel mixture. However, the retardation of the ignition timing leads to decrease in thermal efficiency and torque. In contrast, the high pressure retarded injection can advance the ignition timing by avoiding the abnormal combustion by the devised fuel injection, thereby improving the thermal efficiency and the torque. Specifically, the high pressure retarded injection not only avoids the abnormal combustion, but also advances the ignition timing to advantageously improve the fuel efficiency.

As described above, the high pressure retarded injection in the SI mode reduces each of the injection period, the air-fuel mixture formation period, and the combustion period. The high pressure retarded injection performed in the range (II) in the CI mode reduces each of the injection period, and the air-fuel mixture formation period. Specifically, the turbulence in the cylinder 18 increases by injecting the fuel in the cylinder 18 at the high fuel pressure. This promotes mixing of the atomized fuel. Thus, even when the fuel is injected at the retarded timing near the compression top dead center, the relatively homogeneous air-fuel mixture can quickly be formed in the cylinder 18.

The high pressure retarded injection in the CI mode is performed in the operation range of the engine where the load is relatively high. Specifically, the injector 67 injects the fuel in the cylinder 18 at the retarded timing near the compression top dead center. Thus, the preignition in the compression stroke can be prevented, and the nearly homogeneous air-fuel mixture can quickly be formed as described above. As a result, the air-fuel mixture is surely compression-ignited after the compression top dead center. As the combustion is performed in the expansion stroke where the pressure in the cylinder 18 gradually decreases due to motoring, the combustion proceeds slowly, thereby avoiding rapid increase in rate of pressure increase (dP/dθ) in the cylinder 18 accompanying the compression ignition combustion. This resolves constraints of NVH, thereby expanding the range in the CI mode toward the high load range.

Back to the description of the SI mode, as described above, the high pressure retarded injection in the SI mode reduces the reactive time of the unburnt air-fuel mixture by injecting the fuel in the retarded period. The reduction of the reactive time is advantageous in the low speed range where the rotation speed of the engine 1 is relatively low because long actual time is required for changing a crank angle. In contrast, the reduction of the reactive time is less effective for avoiding the abnormal combustion in the high speed range where the rotation speed of the engine 1 is relatively high because the actual time required for changing the crank angle is short. Conversely, in the retarded injection, the fuel is injected in the cylinder 18 at timing near the compression top dead center. Thus, a gas in the cylinder free from the fuel, i.e., air having a high specific heat ratio, is compressed in the compression stroke. This increases the compression end temperature in the cylinder 18, and the increased compression end temperature may lead to the knocking. Thus, in the retarded injection in the range (IV) where an amount of the fuel to be injected increases, the ignition timing needs to be retarded to avoid the knocking.

In the range (IV) in the SI mode where the rotation speed is relatively high, and the load is high as shown in FIG. 4, the injector 67 injects part of the fuel in the cylinder 18 in the intake stroke, and injects the remaining fuel in the cylinder 18 in the retarded period as shown in FIG. 5D. The injection in the intake stroke reduces the specific heat ratio of the gas in the cylinder (i.e., the air-fuel mixture containing the fuel) in the compression stroke, thereby reducing the compression end temperature. The reduced compression end temperature reduces the knocking, and the PCM 10 can advance the ignition timing.

The high pressure retarded injection in the range (IV) increases the turbulence in the cylinder 18 near the compression top dead center to reduce the combustion period as described above. This is also advantageous in reducing the knocking, and the PCM 10 can further advance the ignition timing. Thus, in the range (IV), the split injection including the injection in the intake stroke and the high pressure retarded injection avoids the abnormal combustion, and improves the thermal efficiency.

In the range (IV), the high pressure retarded injection may be replaced with multi-point ignition to reduce the combustion period. The multi-point ignition uses a plurality of spark plugs disposed in the combustion chamber. Specifically, in the range (IV), the injector 67 injects the fuel in the intake stroke, and the PCM 10 drives the plurality of spark plugs to perform the multi-point ignition. In the multi-point ignition, flame spreads from a plurality of sparks generated in the cylinder 18, the flame rapidly grows to reduce the combustion period. As a result, like the high pressure retarded injection, the multi-point ignition reduces the combustion period to advantageously improve the thermal efficiency.

(Control of Switching from SI Mode to CI Mode)

In the spark ignition combustion, the thermal efficiency is low as compared with that of the compression ignition combustion, and the temperature of the combustion gas is relatively high. On the other hand, in the CI mode in which the compression ignition combustion is performed, at least the internal EGR gas is introduced into the cylinder 18 to increase the temperature in the cylinder 18 and to ensure the ignitability of the compression ignition as described above.

Immediately after the engine 1 is switched from the SI mode where the temperature of the combustion gas is relatively high to the CI mode, the temperature in the cylinder 18 is high, and the high temperature exhaust gas generated by the spark ignition combustion is introduced into the cylinder 18. Thus, the engine 1 performs the compression ignition combustion while the temperature in the cylinder 18 is high. At this time, if the injector 67 injects the fuel in the cylinder 18 at relatively early timing, such as in the intake stroke, the preignition occurs in the compression stroke, thereby rapidly increasing the rate of pressure increase (dP/dθ) in the cylinder 18, and causing loud combustion noise. Thus, the engine 1 performs transitional control to avoid the preignition in switching from the SI mode to the CI mode, and to avoid the increase in combustion noise.

In the operation range in the hot state shown in FIG. 4, for example, the switching from the SI mode to the CI mode is performed when the engine 1 is shifted from the high load range which is the SI mode to the low load range in which is the CI mode. Specifically, as the load of the engine 1 decreases, the engine 1 is switched from the SI mode to the CI mode. The engine 1 may be switched from the SI mode to the CI mode near the boundary between the SI mode and the CI mode even when the load of the engine 1 is unchanged.

When the engine 1 is in a cold or semi-warming state where the temperature of the engine 1 is lower than a predetermined temperature, the compression ignition combustion is not stabilized. Thus, although not shown, the PCM 10 does not perform the CI mode operation, and performs the SI mode operation in the whole operation range of the engine 1. As shown in FIG. 4, when the engine 1 is in the warm state where the temperature is at the predetermined temperature or higher, the PCM 10 performs the CI mode operation in part of the operation range. Thus, as the temperature gradually increases from the cold state to the warm state after the start of the engine 1, the engine 1 may be switched from the SI mode to the CI mode with the load of the engine unchanged.

In view of stabilized combustion, the PCM 10 performs the SI mode operation when the engine 1 is idling. Thus, when the engine 1 is shifted from the idle state to the low load range where the CI mode operation is performed, the engine 1 is switched from the low load SI mode to the low load CI mode. In addition, the engine 1 is configured to stop the fuel supply when the vehicle is slowing down. Since the temperature in the cylinder 18 decreases while the fuel supply is stopped, the compression ignition combustion cannot be performed in some cases immediately after the fuel is supplied again. Thus, the PCM 10 performs the SI mode operation even in the range of the CI mode immediately after the fuel is supplied again to surely stabilize the combustion. Thereafter, as the temperature in the cylinder 18 increases so that the CI mode operation can be performed, the PCM 10 switches the SI mode to the CI mode. Specifically, the engine 1 is switched from the SI mode to the CI mode even though the load is not substantially changed. The switching from the low load SI mode to the low load CI mode, i.e., switching from the SI mode to the CI mode without substantial change in load of the engine 1, is performed in various situations.

Figure 7:
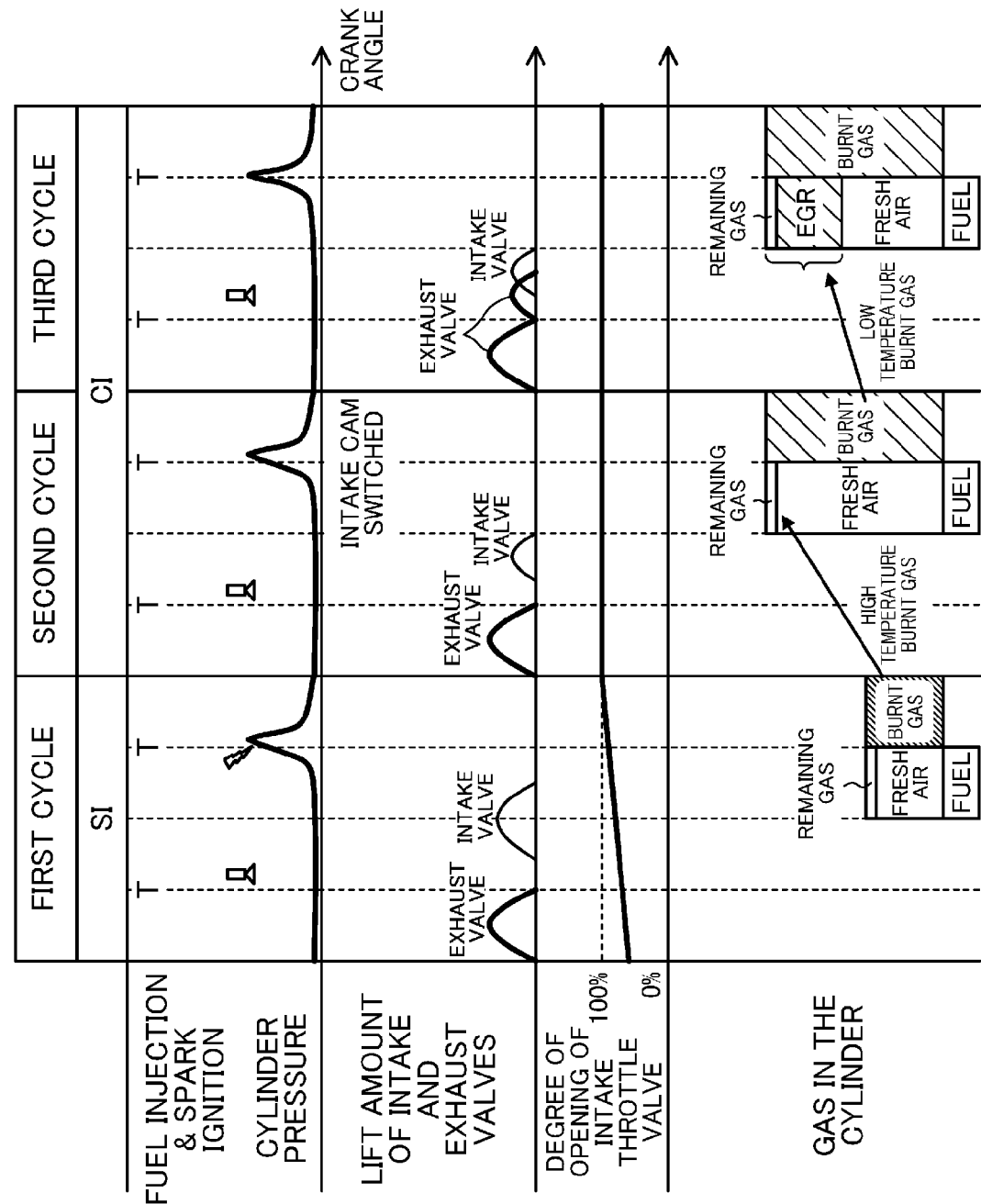
FIG. 7 is a timing chart illustrating transitional control in switching from an SI mode in which an external EGR gas is not introduced to a CI mode.

FIG. 7 is a timing chart illustrating the transitional control performed when the engine 1 is switched from the SI mode where the external EGR gas is not introduced to the CI mode. Specifically, FIG. 7 shows examples of how the timing of the fuel injection and the timing of the spark ignition are changed, how the pressure in the cylinder is changed, when and how the intake/exhaust valves are opened, how the degree of opening of the throttle valve is changed, and how the gas state in the cylinder is changed. In FIG. 7, the crank angle varies from the left to the right of the paper (i.e., time progresses). The timing of the fuel injection, the timing of the spark ignition, and the change in pressure in the cylinder are described to illustrate the disclosed technology, and the disclosed technology is not limited to these timings (the same is applied to FIG. 8, etc.). The SI mode in which the external EGR gas is not introduced corresponds to the SI mode operation performed when the load of the engine is low, for example. Thus, the timing chart shown in FIG. 7 corresponds to the switching of the engine 1 from the low load SI mode to the low load CI mode.

In the first cycle on the leftmost column in FIG. 7, the engine 1 is operated in the SI mode. The injector 67 injects the fuel in a period from the intake stroke to the initial stage of the compression stroke, and the spark plug 25 performs spark ignition near the compression top dead center. In the first cycle, the air-fuel mixture has the theoretical air-fuel ratio ($\lambda \approx 1$), and the intake-side VVL 72 drives the intake valve 21 with the large lift cam, while the VVT 72 closes the intake valve 21 at retarded timing after the intake bottom dead center so that the amount of the fresh air is appropriate to the amount of the injected fuel. Thus, the PCM 10 retards the timing of closing the intake valve 21 to reduce the amount of the fresh air introduced into the cylinder 18 (see the gas state in the cylinder shown in the lowermost row in FIG. 7). In the control example shown in FIG. 7, the PCM 10 reduces the degree of opening of the throttle valve 36 in the first cycle to further reduce the amount of the fresh air to correspond to the operation state of the engine 1. In preparation for the switching to the CI mode in which the throttle valve is fully opened, the PCM 10 gradually opens the throttle valve 36 to the full open state. As described above, the load of the engine 1 is low in the first cycle, although the first cycle is performed in the SI mode. Thus, the PCM 10 does not introduce the external EGR gas into the cylinder 18. The exhaust-side VVL 71 is off. Specifically, the PCM 10 does not introduce the internal EGR gas into the cylinder 18. In the first cycle in which the spark ignition combustion is performed, the temperature of the exhaust gas increases (i.e., the high temperature burnt gas is generated). Since the external and internal EGR gases are not introduced into the cylinder 18, the high temperature exhaust gas is not substantially introduced into the cylinder 18 in the subsequent second cycle.

The second cycle corresponds to a cycle for switching from the SI mode to the CI mode. Specifically, this cycle is performed in a transitional mode. The PCM 10 makes the spark plug 25 inactive to perform the compression ignition combustion. Further, the PCM 10 fully opens the throttle valve, and the intake-side VVL 73 switches the large lift cam driving the intake valve to the small lift cam. The VVT 72 is inactive, and the phase of the intake valve 21 does not change. Thus, the timing of closing the intake valve 21 is instantaneously changed from the timing in the compression stroke in the first cycle to the timing near the intake bottom dead center, thereby increasing the amount of the fresh air introduced into the cylinder 18. The timing of opening/closing the intake valve 21 corresponds to the timing of opening the exhaust valve twice started from the third cycle described later.

In the second cycle, the PCM 10 sets the timing of the fuel injection in the period from the intake stroke to the initial stage of the compression stroke as set in the first cycle, and sets the amount of the injected fuel similar to the amount injected in the first cycle. As compared with the first cycle, the amount of the fresh air introduced into the cylinder 18 increases, while the amount of the injected fuel does not change. Thus, in the second cycle, the air-fuel mixture has the A/F lean of the theoretical air-fuel ratio. Also in the second cycle, the PCM 10 does not introduce the exhaust gas (the external and internal EGR gases) into the cylinder 18.

In the second cycle, the compression ignition combustion is performed, and the exhaust gas is not introduced into the cylinder 18. Thus, the temperature in the cylinder 18 decreases. In the second cycle, the amount of the fresh air introduced into the cylinder 18 is increased to fill the cylinder 18 with the fresh air at relatively low temperature. This reduces the temperature in the cylinder 18 before the start of the compression. As a result, in the second cycle subsequent to the first cycle performed in the SI mode, and in which the temperature in the cylinder 18 relatively easily increases, the air-fuel mixture in the cylinder 18 does not cause the preignition, and is compression-ignited at appropriate timing near the compression top dead center. In the second cycle, the temperature of the combustion gas greatly decreases because the air-fuel mixture has the A/F ratio lean of the theoretical air-fuel ratio, the amount of the gas is large relative to the amount of the fuel, and the compression ignition combustion with high thermal efficiency is performed. This reduces the temperature of the exhaust gas emitted from the cylinder 18 in the second cycle. In the gas state shown in the lowermost row in FIG. 7, the level of the temperature of the "burnt gas" is indicated by a pitch between hatch lines. A small pitch indicates the high temperature of the burnt gas, and a large pitch indicates the low temperature of the burnt gas.

The subsequent third cycle corresponds to a cycle for switching from the transitional mode to the CI mode. In the third cycle, the PCM 10 turns the exhaust-side VVL 71 on. Specifically, the exhaust valve 22 is opened twice, thereby introducing part of the burnt gas generated by the compression ignition combustion in the second cycle into the cylinder 18.

In the third cycle, the intake-side VVL 73 opens/closes the intake valve 21 with the small lift cam, and the PCM 10 fully opens the throttle valve 36 in the same manner as in the second cycle. Thus, as shown in FIG. 7, the internal EGR gas is introduced into the cylinder 18, and the amount of the fresh air introduced into the cylinder 18 is reduced to be smaller than the amount introduced in the second cycle. Accordingly, an EGR ratio in the second cycle in the transitional mode is lower than the EGR ratio in the third cycle in the CI mode. The EGR ratio is a ratio of the amount of the exhaust gas to the whole amount of the gas in the cylinder 18.

In the third cycle, part of the burnt gas is introduced into the cylinder 18. However, the burnt gas is relatively low in temperature as described above. The compression ignition combustion performed in the second cycle reduces the temperature in the cylinder 18. Thus, the temperature in the cylinder 18 in the third cycle does not excessively increase.

The third cycle corresponds to the normal CI mode. Thus, the PCM 10 sets the timing when the injector 67 injects the fuel in the period from the intake stroke to the initial stage of the compression stroke in the same manner as the second cycle. This allows formation of the relatively homogeneous air-fuel mixture in the cylinder 18. The PCM 10 sets the amount of the fuel injected in the third cycle to be similar to the amount injected in the second cycle. This makes the A/F of the air-fuel mixture equal to or lean of the theoretical air-fuel ratio. The A/F of the air-fuel mixture is set in accordance with the operation state of the engine 1.

The PCM 10 makes the spark plug 25 inactive in the third cycle in the same manner as the second cycle. As described above, the temperature in the cylinder 18 does not excessively increase in the third cycle, the preignition of the relatively homogeneous air-fuel mixture formed in the cylinder 18 does not occur, and the air-fuel mixture is surely compression-ignited near the compression top dead center, and stably combusted.

The transitional control avoids the increase in combustion noise in switching from the SI mode to the CI mode. After the third cycle in which the switching from the SI mode to the CI mode has been done, combustion control is performed in accordance with the operation state of the engine 1.

Figure 8:
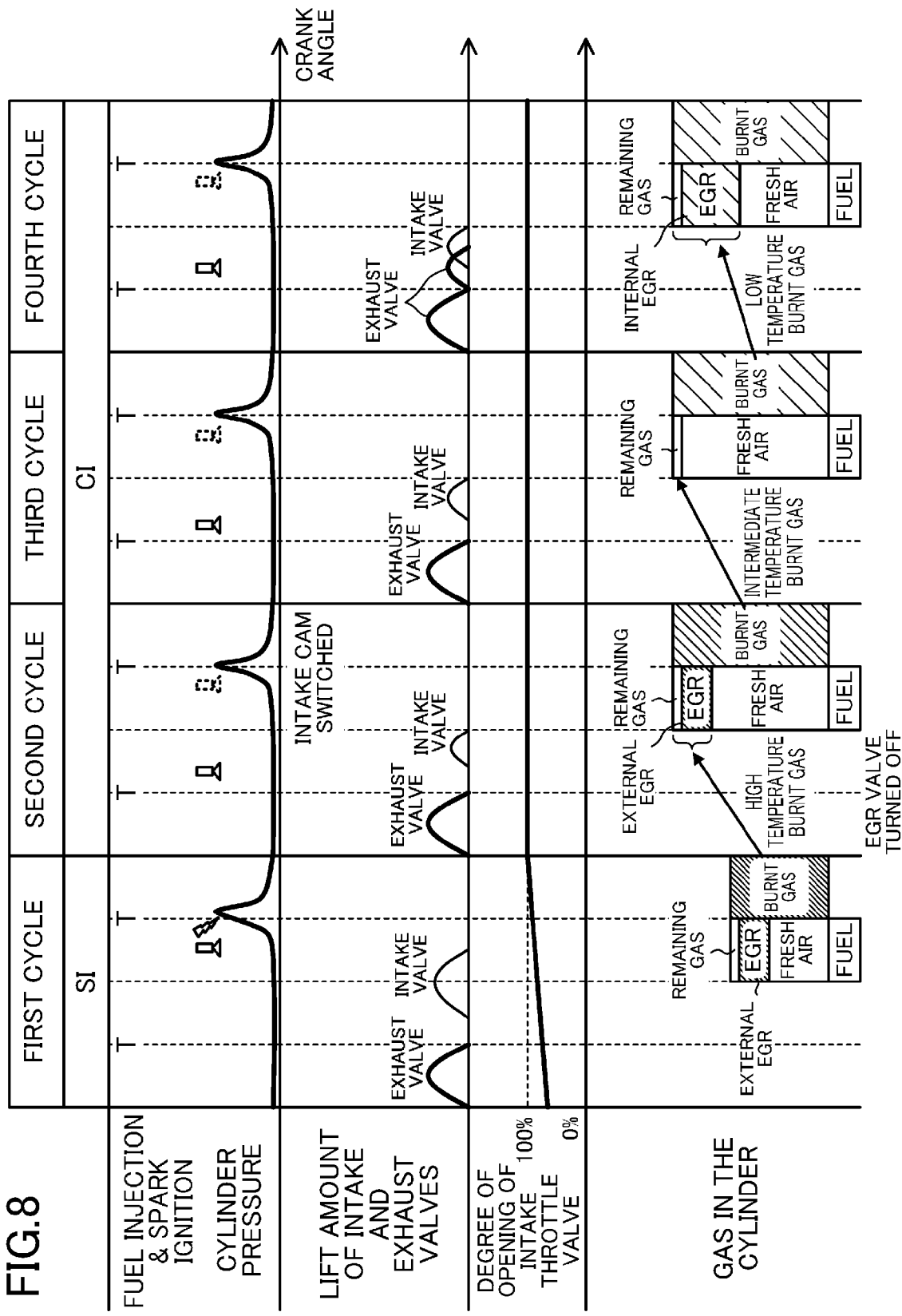
FIG. 8 is a timing chart illustrating transitional control in switching from the SI mode in which an external EGR gas is introduced to the CI mode.

FIG. 8 is a timing chart showing the transitional control in switching the engine 1 from the SI mode in which the external EGR gas is introduced to the CI mode. The timing chart of FIG. 8 corresponds to a situation in which the engine 1 is switched from the high load SI mode to the low load CI mode. Specifically, in the operation range in the warm state shown in FIG. 4, the timing chart corresponds to a situation in which the engine 1 is shifted from the range (III) or the range (IV) where the engine 1 is operated in the SI mode to the range (I) or the range (II) where the engine is operated in the CI mode (see an arrow (a) in FIG. 4).

Specifically, in the first cycle shown in the leftmost column of FIG. 8, the engine 1 is operated in the SI mode. The injector 67 injects the fuel in the period from the terminal stage of the compression stroke to the initial stage of the expansion stroke. That is, the injector 67 performs the high pressure retarded injection. The spark plug 25 performs the spark ignition near the compression top dead center. The air-fuel mixture has the theoretical air-fuel ratio ($\lambda \approx 1$). The intake-side VVL 73 drives the intake valve 21 with the large lift cam, and the VVT 72 sets the timing of closing the intake valve 21 to timing after the intake bottom dead center so that the amount of the fresh air is appropriate to the amount of the injected fuel. The PCM 10 retards the timing of closing the intake valve 21 to reduce the amount of the fresh air introduced into the cylinder 18. In the first cycle in the timing chart of FIG. 8, the PCM 10 reduces the degree of opening of the throttle valve 36, and gradually increases the degree of opening to the full open state in the same manner as in the first cycle in the timing chart of FIG. 7 described above.

In the first cycle in the timing chart of FIG. 8, the PCM 10 opens the EGR valve 511 and/or the EGR cooler bypass valve 531. Thus, the external EGR gas is introduced into the cylinder 18 through the EGR passage 50 as described above. The exhaust-side VVL 71 is off, and the internal EGR gas is not introduced into the cylinder 18. The temperature of the exhaust gas may increase in the first cycle where the spark ignition combustion is performed.

The subsequent second cycle corresponds to the transitional mode for switching from the SI mode to the CI mode. Thus, in the second cycle, the PCM 10 makes the spark plug 25 inactive to perform the compression ignition combustion. The PCM 10 fully opens the throttle valve, and the intake-side VVL 73 switches the large lift cam driving the intake valve to the small lift cam. Thus, the timing of closing the intake valve 21 is instantaneously changed from the timing in the compression stroke in the first cycle to the timing near the intake bottom dead center, thereby increasing the amount of the fresh air introduced into the cylinder 18.

In the second cycle, the PCM 10 completely closes the EGR valve 511 and/or the EGR cooler bypass valve 531. This stops the introduction of the external EGR gas into the cylinder 18. However, since the external EGR system does not show a quick response to the control, the relatively hot exhaust gas remaining in the EGR passage 50 is introduced into the cylinder 18 in the second cycle even after the EGR valve 511 and the EGR cooler bypass valve 531 are fully closed (see the gas state shown in the lowermost row in FIG. 8). On the other hand, the exhaust-side VVL 71 is still off in the second cycle. Specifically, the PCM 10 does not introduce the internal EGR gas into the cylinder 18.

The PCM 10 sets the amount of the fuel injected by the injector 67 to be substantially the same as the amount injected in the first cycle. The PCM 10 sets the timing of injecting the fuel in the period from the intake stroke to the initial stage of the compression stroke. Thus, the relatively homogeneous air-fuel mixture which is lean of the theoretical air-fuel ratio is formed in the cylinder 18 in the second cycle.

The PCM 10 does not activate the spark plug 25 in the second cycle, and allows compression auto-ignition of the homogeneous air-fuel mixture lean of the theoretical air-fuel ratio near the compression top dead center. In the second cycle, the amount of the fresh air introduced into the cylinder 18 increases to decrease the temperature in the cylinder 18 before the start of the compression. As a result, the air-fuel mixture in the cylinder 18 is compression-ignited at appropriate timing near the compression top dead center without causing the preignition. In the second cycle, the A/F of the air-fuel mixture is lean of the theoretical air-fuel ratio, and a ratio of a working gas to the fuel G/F is lean. Further, the temperature of the combustion gas decreases because the compression ignition combustion with high thermal efficiency is performed. As a result, the temperature of the exhaust gas emitted in the second cycle decreases.

As described above, part of the external EGR gas is introduced into the cylinder 18 in the second cycle. Accordingly, the temperature of the exhaust gas may slightly increase. For convenience's sake, the burnt gas in the second cycle is referred to as an intermediate temperature burnt gas at an intermediate temperature between the temperature of a high temperature burnt gas and the temperature of a low temperature burnt gas. If the exhaust-side VVL 73 is turned on in the subsequent third cycle to introduce a large amount of the intermediate temperature burnt gas into the cylinder 18, the temperature in the cylinder 18 may excessively increase.

Thus, in the control example shown in FIG. 8, the PCM 10 performs several cycles continuously in the transitional mode. Specifically, the PCM 10 turns the exhaust side VVL 71 off to perform the third cycle in the same manner as the second cycle. In the third cycle, the exhaust gas does not remain in the EGR passage 50, and the exhaust gas is not introduced into the cylinder 18. As a result, the temperature in the cylinder 18 before the start of the compression is lower than the temperature in the second cycle, and the A/F of the air-fuel mixture is lean of the A/F in the second cycle. Thus, the temperature of the exhaust gas emitted through the compression ignition combustion in the third cycle is reduced to be lower than the temperature of the exhaust gas emitted in the second cycle (i.e., the low temperature burnt gas is emitted).

The fourth cycle corresponds to a cycle for switching from the transitional mode to the CI mode. The fourth cycle in the timing chart of FIG. 8 corresponds to the third cycle in the timing chart of FIG. 7. The PCM 10 turns the exhaust-side VVL 71 on to open the exhaust valve 22 twice. Thus, part of the relatively low temperature burnt gas generated by the compression ignition combustion in the third cycle is introduced into the cylinder 18. In the fourth cycle, the amount of the fresh air introduced into the cylinder 18 is reduced as compared with the amount of the fresh air introduced in the second and third cycles because the internal EGR gas is introduced into the cylinder 18. Specifically, the EGR ratio relatively increases in the fourth cycle.

Since the fourth cycle corresponds to the normal CI mode, the injector 67 injects the fuel in the period from the intake stroke to the initial stage of the compression stroke. The amount of the fuel injected by the injector 67 is substantially the same as the amount injected in the second and third cycles in the transitional mode. The A/F of the air-fuel mixture is rich as compared with the A/F in the second and third cycles, and is theoretical, or lean of the theoretical air-fuel ratio.

Also in the fourth cycle, the PCM 10 makes the spark plug 25 inactive to perform the compression ignition combustion. Since the temperature in the cylinder 18 does not excessively increase as described above, the preignition of the relatively homogeneous air-fuel mixture does not occur, and the air-fuel mixture is surely compression-ignited near the compression top dead center, and stably combusted.

When the engine 1 is operated under a high load, the injector 67 injects a large amount of the fuel. Thus, when the engine 1 is operated in the high load SI mode, the temperature in the cylinder 18 increases, and the temperature of the exhaust gas increases. Accordingly, the preignition easily occurs particularly in switching from the high load SI mode to the low load CI mode. In the control example of FIG. 8, two cycles are continuously performed in the transitional mode. This is advantageous in surely avoiding the preignition in switching from the SI mode to the CI mode.

In the transitional mode, the EGR ratio in the cylinder 18 is reduced as compared with the EGR ratio in the CI mode to reduce the temperature in the cylinder 18, thereby avoiding the preignition. However, as described above, the temperature in the cylinder 18 increases particularly in the high load SI mode. When the temperature of a wall of the cylinder 18 is high, the preignition may not be avoided in the transitional mode. In such a case, the PCM 10 may retard the timing of the fuel injection by the injector 67 after the intermediate stage of the compression stroke as indicated by a broken line in FIG. 8. Specifically, the PCM 10 may perform the retarded injection in the transitional mode. In the retarded injection, the fuel is injected at retarded timing, and the reactive time of the air-fuel mixture is reduced. Thus, the preignition in the transitional mode is advantageously avoided. The PCM 10 may estimate the temperature in the cylinder 18 based on various parameters, for example, and may set the timing of the fuel injection by the injector 67 in the period from the intake stroke to the initial stage of the compression stroke, or after the intermediate stage of the compression stroke based on the estimation results.

The retarded injection is not performed only in the transitional mode. The PCM 10 may perform the retarded injection as needed after the fourth cycle in which the engine 1 is switched to the CI mode as indicated by a dot-and-dash line in FIG. 8. Specifically, the PCM 10 switches the engine 1 from the transitional mode to the CI mode when the ignitability is not ensured unless the exhaust-side VVL 71 is turned on to introduce the internal EGR gas into the cylinder 18, while the PCM 10 allows the injector 67 to perform the retarded injection when the preignition may possibly occur in the CI mode. This makes it possible to surely avoid the generation of the combustion noise in switching the engine 1 from the SI mode to the CI mode, and to stably perform the compression ignition combustion. In switching from the low load SI mode to the low load CI mode as shown in FIG. 7, the PCM 10 may perform the retarded injection as needed in the transitional mode or the CI mode.

Figure 9:
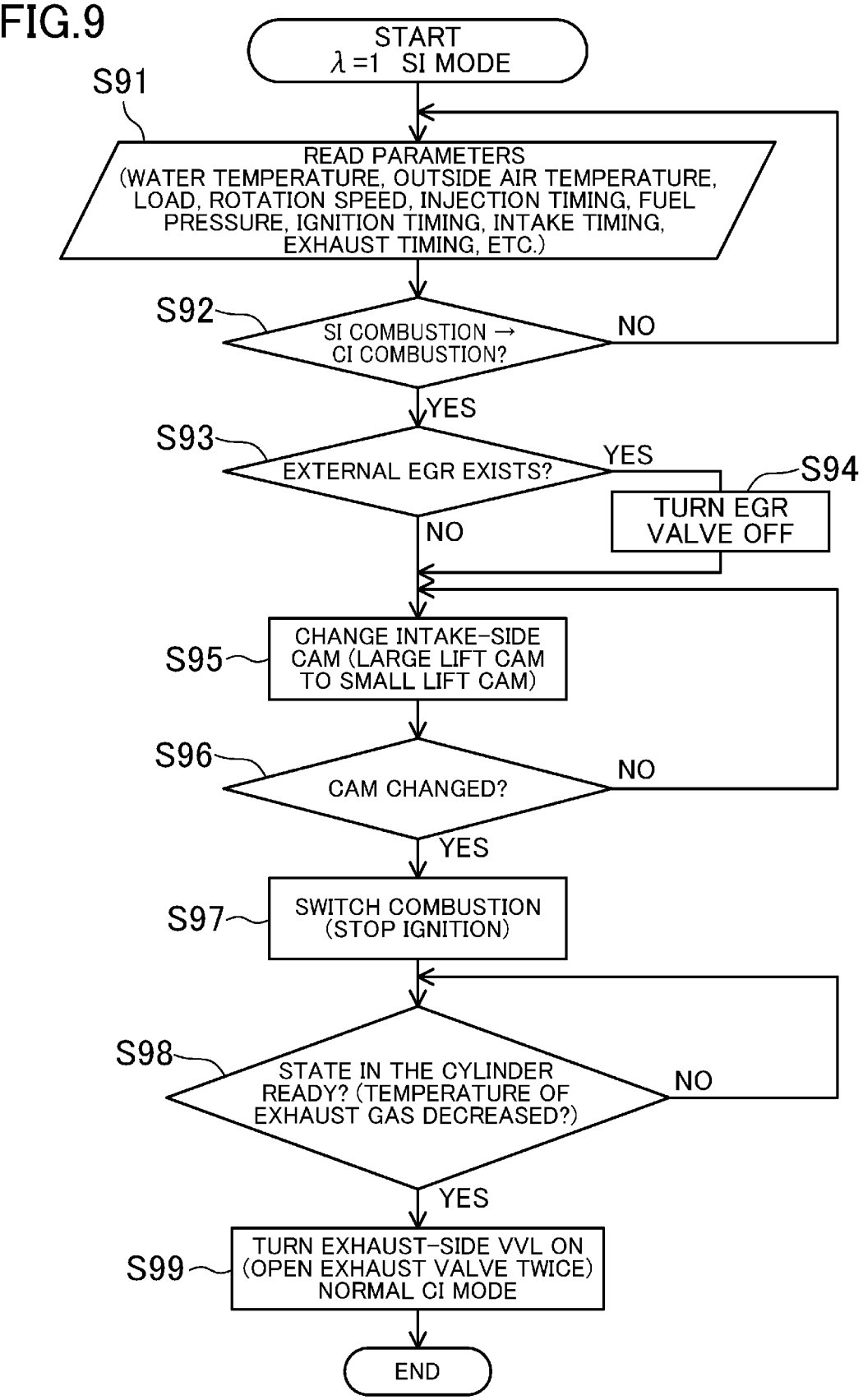
FIG. 9 is a flow chart illustrating transitional control in switching from the SI mode to the CI mode.

Referring to FIG. 9, a flow of the above-described transitional control performed by the PCM 10 will be described below. The flow of FIG. 9 starts in the SI mode where the excess air ratio $\lambda \approx 1$.

In step S91 after the start, the PCM 10 reads various parameters (e.g., a water temperature, an outside air temperature, the load of the engine, the rotational speed of the engine, the timing of the fuel injection, the fuel pressure, the timing of ignition, the timing of opening/closing the intake valve, the timing of opening/closing the exhaust valve, etc.), and check the operation state of the engine 1. In step S92, the PCM 10 determines whether the engine 1 is switched from the SI mode to the CI mode or not. When the engine 1 is not switched to the CI mode (NO is chosen), the flow repeats the steps S91 and S92. When the engine is switched to the CI mode (YES is chosen), the flow proceeds to step S93. Specifically, in step S92, YES is chosen when the engine 1 operated in the high load state is changed to the low load state, when the engine 1 in the cold state is changed to the warm state, when the idling engine 1 is changed to a low load operation state except for the idling state, and when the engine 1 temporarily operated in the SI mode after the restart of the fuel supply is switched to the CI mode, for example. A period from the start of the flow to step S92 corresponds to the first cycle in the timing chart of FIGS. 7 and 8.

In step S93, the PCM 10 determines whether the external EGR gas is introduced into the cylinder 18 or not. The flow proceeds to step S94 when the external EGR gas is introduced into the cylinder 18. The PCM 10 completely closes the EGR valve 511 and/or the EGR cooler bypass valve 531 in step S94. The flow proceeds from step S93 to step S95 when the external EGR gas is not introduced into the cylinder 18.

In step S95, the PCM 10 switches the large lift cam of the intake-side VVL 73 driving the intake valve to the small lift cam. In subsequent step S96, the PCM 10 determines whether the cam of the intake-side VVL 71 has been switched or not. When the cam has not been switched (NO is chosen), the flow continues step S95. When the cam has been switched (YES is chosen), the flow proceeds to step S97. The cam is instantaneously switched. In step S97, the PCM 10 makes the spark plug 25 inactive, thereby switching the engine 1 from the SI mode to the CI mode.

In subsequent step S98, the PCM 10 determines whether the state in the cylinder is ready or not, i.e., whether the temperature of the exhaust gas has been reduced to a desired level or not. For example, the PCM 10 may perform the determination in this step based on the temperature of the exhaust gas estimated based on the various parameters. The flow continues step S98 when the result of the determination is NO in step S98. The flow proceeds to step S99 when the result of the determination is YES. Steps S93-S98 correspond to the second cycle in the timing chart of FIG. 7 and the second and third cycles in the timing chart of FIG. 8 in the transitional mode. Thus, the number of cycles performed in the transitional mode is determined in step S98. Specifically, while only a single cycle, i.e., the second cycle, is performed in the transitional mode in the control example of FIG. 7, the PCM 10 may perform several cycles continuously in the transitional mode based on the temperature of the exhaust gas. In the control example of FIG. 8, two cycles, i.e., the second and third cycles, are performed in the transitional mode. The PCM 10 may perform three or more cycles, or only a single cycle, in the transitional mode based on the temperature of the exhaust gas.

In step S98, the PCM 10 determines the number of cycles performed in the transitional mode based on the estimated temperature of the exhaust gas. Alternatively, the PCM 10 may previously store the number of cycles performed in the transitional mode based on the operation state of the engine 1 before and after the switching from the SI mode to the CI mode, etc. so that the PCM 10 performs the determined number of cycles in the transitional mode in step S98.

In step S99 after step S98, the PCM 10 turns the exhaust-side VVL 71 on to start opening the exhaust valve 22 twice. This step corresponds to the third cycle shown in FIG. 7, and the fourth cycle shown in FIG. 8. Thus, the engine 1 is switched from the SI mode to the CI mode.

(Details of Valve Control)

Details of control of the intake valve 21 and the exhaust valve 22 in the switching from the SI mode to the CI mode will be described with reference to FIG. 10. In the first cycle in the timing chart of FIG. 7 or FIG. 8, i.e., in the SI mode, the exhaust valve 22 is opened in the exhaust stroke as indicated by a dot-and-dash line in FIG. 10, and the intake valve 21 is opened in the intake stroke as indicated by a broken line in FIG. 10. Specifically, the exhaust-side VVL 71 is operated in the normal mode, and the intake-side VVL 73 drives the intake valve with the large lift cam. This corresponds to a first valve operation.

In the transitional mode (i.e., in the second cycle shown in FIG. 7 and the second and third cycles shown in FIG. 8), the exhaust valve 22 keeps showing a lift characteristic indicated by the dot-and-dash line. The intake valve 21 is opened for a shorter period as illustrated by a thin solid line as compared with the opening period in the first valve operation. Thus, in the transitional mode, the exhaust valve 22 is opened in the exhaust stroke, while the intake valve 21 is opened in the intake stroke like in the SI mode. In switching from the SI mode to the transitional mode, the cam of the exhaust-side VVL 71 is not switched, while only the large lift cam of the intake-side VVL 73 is switched to the small lift cam. The lift characteristic of the intake valve 21 can instantaneously be changed by switching the cam of the intake-side VVL. This corresponds to a second valve operation.

In the third cycle shown in FIG. 7 and the fourth cycle shown in FIG. 8 corresponding to the CI mode, the exhaust valve 22 is opened twice, and shows the lift characteristic as indicated by a thick solid line in FIG. 10. The intake valve 21 keeps showing the lift characteristic indicated by the thin solid line. Specifically, in switching from the transitional mode to the CI mode, the cam of the intake-side VVL 73 is not switched, and only the cam of the exhaust-side VVL 71 is switched. This corresponds to a third valve operation. In the third valve operation, in addition to the second valve operation, the exhaust valve 22 is brought into an open state at timing later than the timing of closing the exhaust valve 22 in the second valve operation.

The configuration including the intake-side VVL 73 and the exhaust-side VVL 71 improves a response to the control for switching from the SI mode to the CI mode through the transitional mode, and is advantageous in smoothly switching from the SI mode to the CI mode.

Figure 11:
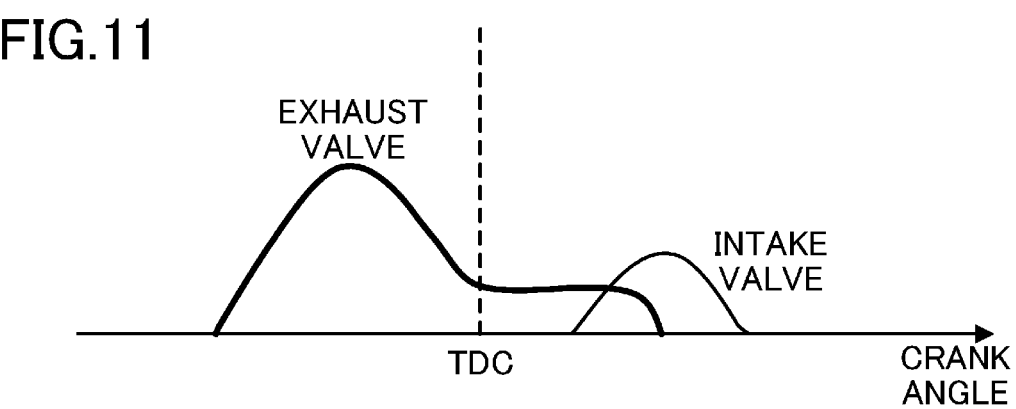
FIG. 11 is a view illustrating the lift amounts of the intake valve and the exhaust valve associated with the exhaust valve opened twice and different from the lift amounts of FIG. 10.
Figure 12:
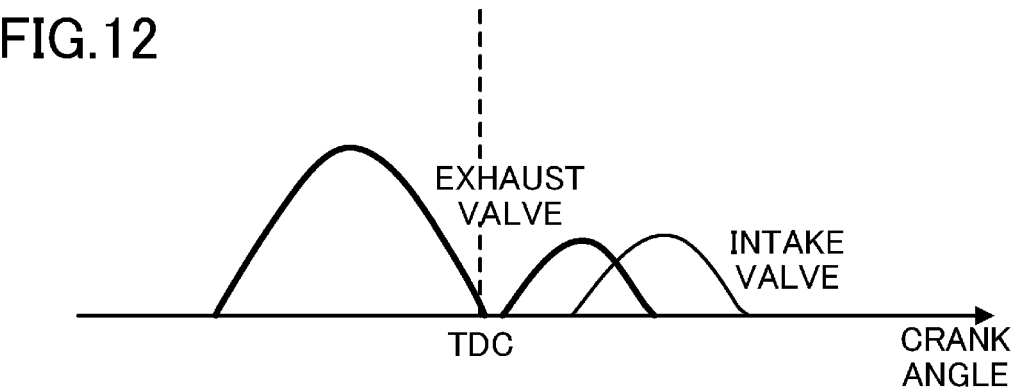
FIG. 12 shows the lift amounts of the intake valve and the exhaust valve associated with the exhaust valve opened twice and different from the lift amounts of FIGS. 10 and 11.

In opening the exhaust valve 22 twice, the lift characteristic shown in FIG. 10 may be replaced with lift characteristics shown in FIGS. 11 and 12. The lift characteristic of the exhaust valve 22 illustrated by the thick solid line in FIG. 10 indicates that the lift amount of the exhaust valve 22 maximized in the exhaust stroke is gradually reduced, and then increased again in the intake stroke. Specifically, the lift characteristic has two peaks of the lift amount of the exhaust valve 22 as the crank angle varies. The lift characteristic of the exhaust valve 22 indicates that the exhaust valve 22 is in the open state at timing later than the timing of closing the exhaust valve 22 in the SI mode as compared with the lift characteristic of the exhaust valve 22 in the SI mode illustrated by the dot-and-dash line in FIG. 10.

The lift characteristic shown in FIG. 11 indicates that the lift amount of the exhaust valve 22 maximized in the exhaust stroke is gradually reduced to a predetermined level, and is kept at the predetermined level until predetermined timing in the intake stroke. Specifically, the lift characteristic shows a substantially single peak, while a bottom part of the characteristic curve extends in a direction of the variation of the crank angle. Although not shown, after the lift amount of the exhaust valve 22 maximized in the exhaust stroke is gradually reduced to the predetermined level, the rate of decrease of the lift amount is not reduced to zero, but may be reduced to a lower value to keep the exhaust valve 22 open for a longer time while reducing the degree of opening of the exhaust valve 22. The lift characteristic shown in FIG. 11 also indicates that the exhaust valve 22 is in the open state at the timing later than the timing of closing the exhaust valve 22 in the SI mode.

The lift characteristics of the exhaust valve 22 shown in FIG. 10 and FIG. 11 indicate that the exhaust valve 22 is not closed near an exhaust top dead center. On the other hand, as indicated by the lift characteristic of FIG. 12, the exhaust valve 22 opened twice may be once closed near the exhaust top dead center. This lift characteristic also indicates that the exhaust valve 22 is in the open state at the timing later than the timing of closing the exhaust valve 22 in the SI mode.

Figure 13:
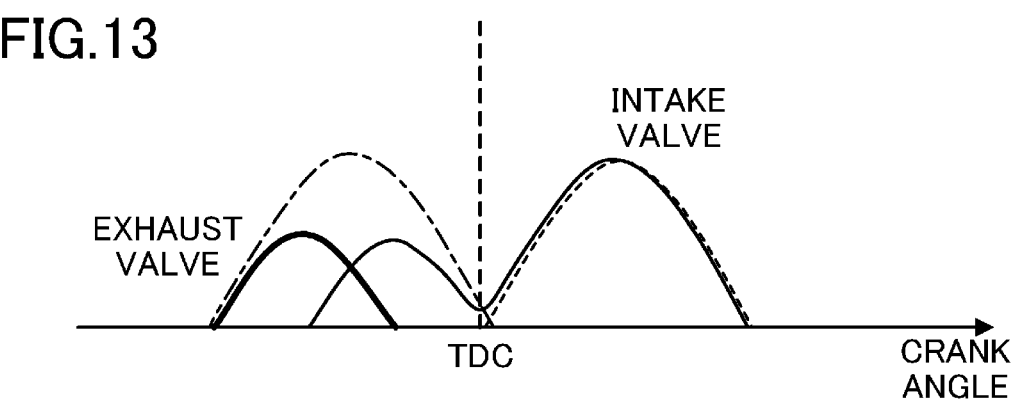
FIG. 13 shows the lift amounts of the intake valve and the exhaust valve associated with the intake valve opened twice.

In the above-described control example, the PCM 10 opens the exhaust valve 22 twice in the CI mode. As described above, the engine 1 may be configured to open the intake valve 21 twice in place of opening the exhaust valve 22 twice. FIG. 13 shows the lift characteristics of the valves when the intake valve 21 is opened twice. The lift characteristic of the intake valve 21 opened twice can be line-symmetric to the lift characteristic of the exhaust valve 22 opened twice shown in FIG. 10 about the exhaust top dead center. The valve control in switching from the SI mode to the CI mode can be performed in a reverse order of the control for opening the exhaust valve 22 twice.

Specifically, in the cycle corresponding to the SI mode, the exhaust valve 22 is opened in the exhaust stroke as indicated by a dot-and-dash line in FIG. 13, while the intake valve 21 is opened in the intake stroke as indicated by a broken line in FIG. 13. This corresponds to the first valve operation. The intake-side VVL 73 operates the intake valve in the normal mode, while the exhaust-side VVL 71 operates the exhaust valve with the large lift cam.

In the cycle corresponding to the transitional mode, the intake valve 21 keeps showing the lift characteristic indicated by the broken line, while the exhaust valve 22 is opened for a shorter period than the opening period in the first valve operation as indicated by the thick solid line. Specifically, only the cam of the exhaust-side VVL 71 is switched, while the cam of the intake-side VVL 73 is not switched in switching from the SI mode to the transitional mode. This corresponds to the second valve operation.

In the cycle corresponding to the CI mode, the intake valve 21 is opened twice to show the lift characteristic indicated by the thin solid line in FIG. 10. The exhaust valve 22 keeps showing the lift characteristic indicated by the thick solid line. Specifically, only the cam of the intake-side VVL 73 is switched, while the cam of the exhaust-side VVL 71 is not switched in switching from the transitional mode to the CI mode. Thus, in the CI mode, the intake valve 21 is in the open state at timing earlier than the timing of opening the intake valve 21 in the SI mode indicated by the broken line in FIG. 13. This corresponds to the third valve operation.

The lift characteristic of the intake valve 21 opened twice is not limited to the lift characteristic shown in FIG. 13. Although not shown, the intake valve 21 may show a lift characteristic which is line-symmetric to the lift characteristic shown in FIG. 11 about the exhaust top dead center, or a lift characteristic which is line-symmetric to the lift characteristic shown in FIG. 12 about the exhaust top dead center.

As described above, in switching the engine 1 from the SI mode to the CI mode as indicated by the arrow (a) in FIG. 4, the engine 1 in the SI mode is once switched to the transitional mode in which the EGR ratio is relatively reduced before switching to the CI mode. This can avoid the preignition in the switching from the SI mode and the CI mode, and can avoid the generation of the combustion noise. In switching the engine 1 from the SI mode to the CI mode without substantial change in load of the engine 1, the engine 1 in the SI mode is once switched to the transitional mode before switching to the CI mode.

As indicated by an arrow (b) in FIG. 4, for example, the combustion noise does not occur in switching the engine 1 from the CI mode to the SI mode because the load of the engine 1 increases. Thus, the engine 1 is not operated in the transitional mode in switching from the CI mode to the SI mode so that the mode can quickly be changed. Specifically, in the timing chart of FIG. 7, the flow returns from the third cycle to the first cycle without performing the second cycle in switching from the CI mode to the SI mode. Likewise, in the timing chart of FIG. 8, the flow returns from the fourth cycle to the first cycle without performing the second and third cycles in switching from the CI mode to the SI mode. This improves a response to the driver's request for acceleration.

(Other Configuration of Engine)

Figure 14:
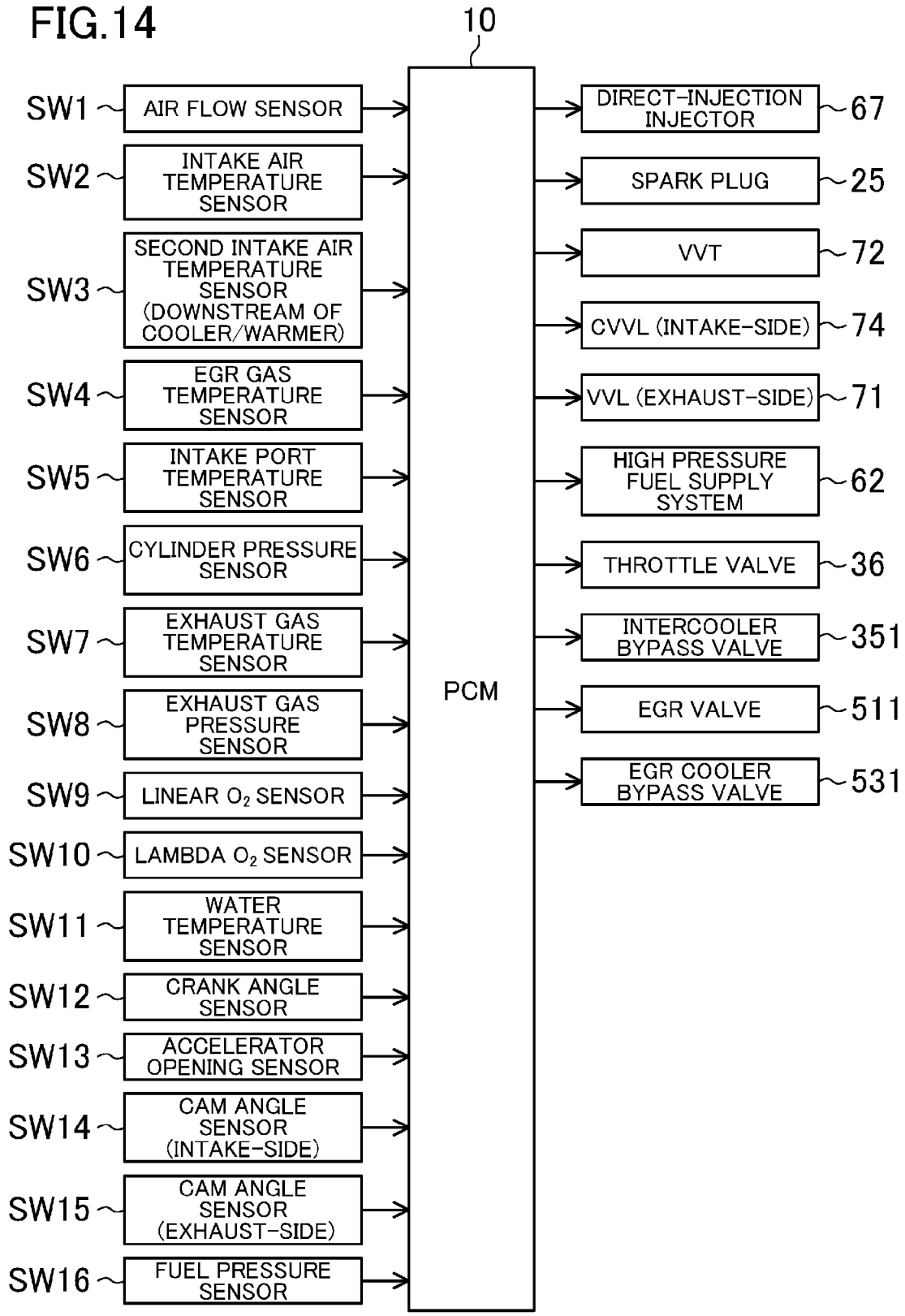
FIG. 14 is a block diagram illustrating a spark ignition direct injection engine having a configuration different from the configuration shown in FIG. 2.

In the configuration shown in FIG. 2, the valve mechanism of the intake valve 21 includes the VVL 73 configured to perform the switching between the large lift cam and the small lift cam. Unlike this configuration, as shown in FIG. 14, the valve mechanism of the intake valve 21 may include, in place of the VVL, a continuously variable valve lift (CVVL) 74 capable of continuously varying the lift amount of the intake valve. The CVVL 74 may have various known configurations as appropriate, and details thereof are not described. The VVT 72 and the CVVL 74 make it possible to continuously change the timing of opening/closing the intake valve 21, and the lift amount of the intake valve 21 (and a period in which the valve is opened).

Figure 15:
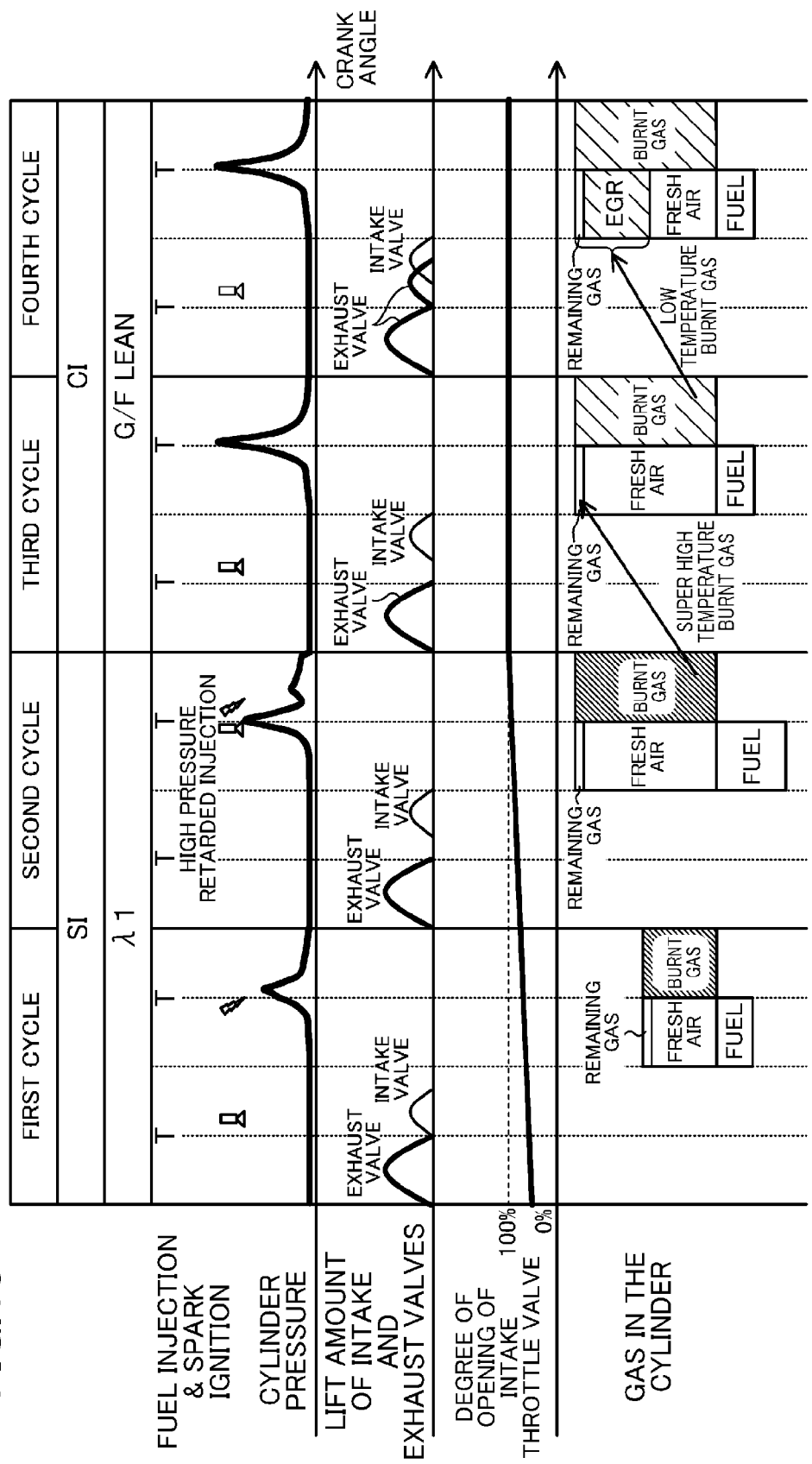
FIG. 15 is a timing chart illustrating transitional control in switching from the SI mode in which the external EGR gas is not introduced to the CI mode different from the transitional control of FIG. 7.
Figure 16:
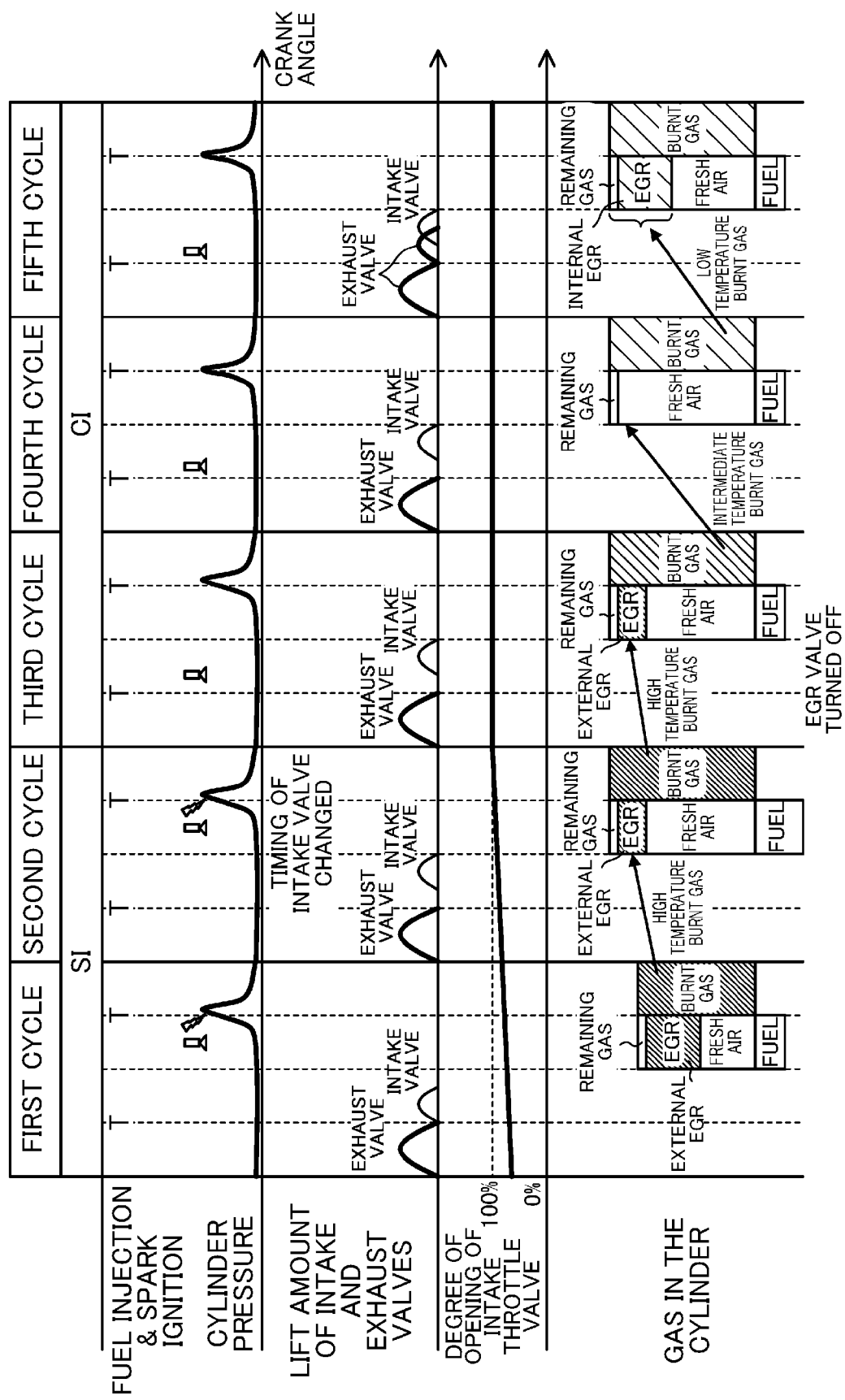
FIG. 16 is a timing chart illustrating transitional control in switching from the SI mode in which the external EGR gas is introduced to the CI mode different from the transitional control of FIG. 8.

FIGS. 15 and 16 show examples of the switching from the SI mode to the CI mode using the valve mechanism of the intake valve 21 including the CVVL 74. FIG. 15 shows a timing chart related to the switching from the SI mode in which the external EGR gas is not introduced to the CI mode, and corresponds to FIG. 7. FIG. 16 shows a timing chart related to the switching from the SI mode in which the external EGR gas is introduced to the CI mode, and corresponds to FIG. 8.

The first cycle in the leftmost column in FIG. 15 is substantially the same as the first cycle in FIG. 7. Specifically, the engine 1 is operated in the SI mode. The injector 67 injects the fuel in the period from the intake stroke to the initial stage of the compression stroke, and the spark plug 25 performs the spark ignition near the compression top dead center. The air-fuel mixture has the theoretical air-fuel ratio ($\lambda \approx 1$).

The intake-side CVVL 74 drives the intake valve 21 with a relatively small lift amount to control the amount of the fresh air appropriate to the amount of the injected fuel, and the VVT 72 sets the timing of closing the intake valve 21 to relatively early timing before the intake bottom dead center. Thus, the intake valve 21 is closed earlier, and the amount of the fresh air introduced into the cylinder 18 is reduced. Also in the control example of FIG. 15, the PCM 10 reduces the degree of opening of the throttle valve 36 in the first cycle. However, the PCM 10 gradually opens the throttle valve 36 to the full open state in preparation for the switching to the CI mode. Further, the PCM 10 closes the EGR valve 511 and/or the EGR cooler bypass valve 531, and turns the exhaust-side VVL 71 off. Thus, the external EGR gas and the internal EGR gas are not introduced into the cylinder 18.

The subsequent second cycle corresponds to a cycle immediately before the switching from the SI mode to the CI mode. In the second cycle, in preparation for opening the exhaust valve 22 twice after the switching to the CI mode, the PCM 10 activates the VVT 72 to retard the timing of closing the intake valve 21. The PCM 10 continues the operation of opening the throttle valve 36. Thus, the amount of the fresh air introduced into the cylinder 18 increases as compared with the amount introduced in the first cycle. The PCM 10 increases the amount of the injected fuel in the second cycle. The A/F of the air-fuel mixture is kept to the theoretical air-fuel ratio. This allows use of the three-way catalyst, and avoids deterioration of the exhaust emission performance.

The PCM 10 allows the injector 67 to perform the high pressure retarded injection in the second cycle. The injector 67 injects the fuel near the compression top dead center. The PCM 10 allows the spark plug 25 to perform the spark ignition at timing after the compression top dead center. Thus, the timing of the ignition is retarded to retard the start of the combustion period. Thus, the load of the engine 1 is kept unchanged in the first and second cycles (the torque is kept unchanged). Retarding the start of the combustion period further increases the temperature of the exhaust gas (the burnt gas), i.e., a super high temperature burnt gas is generated.

The third cycle corresponds to a cycle performed in the transitional mode for switching from the SI mode from the CI mode. The PCM 10 makes the spark plug 25 inactive to perform the compression ignition combustion. The PCM 10 fully opens the throttle valve. The intake valve 21 and the exhaust valve 22 keep showing the same lift characteristics as those in the second cycle. Specifically, the PCM 10 keeps the exhaust-side VVL 71 in the off state. Thus, the high temperature burnt gas generated by the spark ignition combustion in the second cycle is not substantially introduced into the cylinder 18. As a result, the temperature in the cylinder 18 is relatively lowered. In the third cycle, the PCM 10 may turn the exhaust-side VVL 71 on, and may reduce the amount of the internal EGR gas to be smaller than the amount of the internal EGR gas set in the CI mode.

In the third cycle, the PCM 10 allows the injector 67 to inject the fuel in the cylinder 18 in the period from the intake stroke to the initial stage of the compression stroke as previously set in the CI mode. Since the temperature in the cylinder 18 is relatively low, the preignition is avoided, and the homogeneous air-fuel mixture in the cylinder 18 is compression-ignited near the compression top dead center, and combusted. Since the temperature of the burnt gas in the second cycle is high, the temperature of the gas remaining in the cylinder 18 increases. As a result, excessive decrease of the temperature in the cylinder 18 is avoided without opening the exhaust valve 22 twice. Thus, the homogeneous air-fuel mixture is surely compression-ignited near the compression top dead center, and stably combusted. The temperature of the combustion gas decreases because the compression ignition combustion takes place in the third cycle, and the ratio of the working gas to the fuel G/F is lean.

The fourth cycle corresponds to the CI mode after the transitional mode is finished. This cycle is substantially the same as the fourth cycle shown in FIG. 7. Specifically, the PCM 10 turns the exhaust-side VVL 71 on as set in the normal CI mode. Thus, part of the burnt gas generated by the compression ignition combustion in the third cycle is introduced into the cylinder 18. As described above, the burnt gas is relatively low in temperature, and decreases the temperature in the cylinder 18. In the fourth cycle, the PCM 10 sets the timing of the fuel injection in the period from the intake stroke to the initial stage of the compression stroke. The preignition is avoided, and the homogeneous air-fuel mixture in the cylinder 18 is compression-ignited near the compression top dead center. As described above, the PCM 10 may perform the retarded injection in the transitional mode or the CI mode.

In the first cycle in the leftmost column of the timing chart of FIG. 16, the engine 1 is operated in the SI mode while introducing the external EGR gas into the cylinder. The air-fuel mixture has the theoretical air-fuel ratio ($\lambda \approx 1$). The PCM 10 allows the injector 67 to perform the retarded injection. The CVVL 74 of the intake valve 21 drives the intake valve 21 with a relatively small lift amount so that the amount of the fresh air is appropriate to the amount of the injected fuel. The VVT 72 closes the intake valve 21 at relatively early timing before the intake bottom dead center.

The PCM 10 reduces the degree of opening of the throttle valve 36. The PCM 10 introduces the external EGR gas into the cylinder 18 through the EGR passage 50. The VVL 71 of the exhaust valve 22 is off.

The second cycle is the same as the second cycle in the timing chart of FIG. 15. The PCM 10 continues the SI mode, and retards the timing of closing the intake valve 21 in preparation for opening the exhaust valve 22 twice. Retarding the timing of closing the intake valve increases the amount of the fresh air introduced into the cylinder 18. The PCM 10 increases the amount of the injected fuel to correspond to the increased fresh air. Thus, the air-fuel mixture has the theoretical air-fuel ratio also in the second cycle. The injector 67 performs the retarded injection to inject the fuel into the cylinder 18.

The third cycle corresponds to a cycle in the transitional mode for switching from the SI mode to the CI mode. The PCM 10 stops the operation of the spark plug 25, and closes the EGR valve 511 and the EGR cooler bypass valve 531. Part of the exhaust gas remaining in the EGR passage 50 is introduced into the cylinder 18.

The PCM 10 reduces the amount of the fuel injected by the injector 67 to approach the amount of the fuel injected in the first cycle. As a result, the A/F of the air-fuel mixture is lean of the theoretical air-fuel ratio. The injector 67 may inject the fuel into the cylinder 18 in the period from the intake stroke to the initial stage of the compression stroke. As described above, when the temperature in the cylinder 18 is high, and the preignition may possibly occur, the PCM 10 may retard the timing of the fuel injection after the terminal stage of the compression stroke. Thus, in the third cycle, the homogeneous air-fuel mixture lean of the air-fuel mixture in the first and second cycles is combusted by the compression ignition. This decreases the temperature of the exhaust gas. However, as described above, part of the high temperature burnt gas is introduced into the cylinder 18 in the third cycle, although the PCM 10 closes the EGR valve 511 and the EGR cooler bypass valve 531. As a result, the temperature of the exhaust gas is not sufficiently reduced. Thus, in the control example of FIG. 16, the PCM 10 performs the subsequent fourth cycle in the transitional mode in the same manner as in the third cycle. The fourth cycle performed in the transitional mode sufficiently decreases the temperature of the exhaust gas.

In the subsequent fifth cycle, when the PCM 10 turns the exhaust-side VVL 71 on to start opening the exhaust valve 22 twice, the exhaust gas at the reduced temperature is introduced into the cylinder 18. Thus, the compression ignition combustion can stably be performed without causing the preignition. In the fifth cycle corresponding to the CI mode, the switching from the SI mode to the CI mode is finished.

Thus, the valve mechanism of the intake valve 21 including the CVVL 74 can also perform the transitional control in switching from the SI mode from the CI mode. Note that the VVL 73 can instantaneously switch the SI mode to the transitional mode as described above. Therefore, as apparent from the comparison between FIG. 7 and FIG. 15, or the comparison between FIG. 8 and FIG. 16, the minimum number of cycles required for the mode switching is different. The VVL 73 is more advantageous because it improves the response to the transitional control, and smoothly performs the mode switching.

(Other Example of Operation Range)

Figure 17:
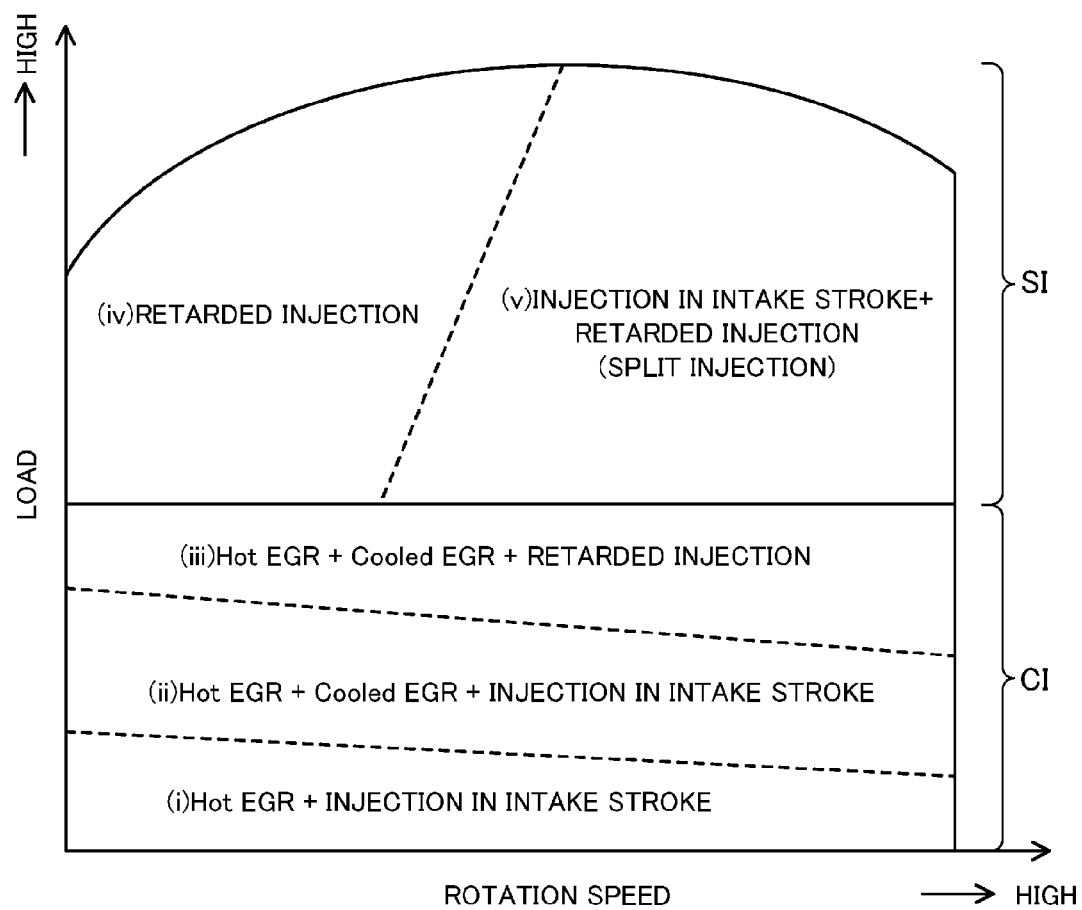
FIG. 17 shows an operation range of the engine different from the operation range of FIG. 4.

FIG. 17 shows another example of the operation range of the engine 1 in the warm state. Unlike the operation range shown in FIG. 4, the range in the CI mode is divided into three ranges in accordance with the level of the load of the engine in the operation range of FIG. 17. Specifically, a range (i) where the load is the lowest in the CI mode corresponds to the range (I) of FIG. 4. In the range (i), the hot EGR gas is introduced into the cylinder 18. Further, in the range (i), the injector 67 injects the fuel in the cylinder 18 at least in the period from the intake stroke to the intermediate stage of the compression stroke as shown in FIG. 5A. Thus, a homogeneous and lean air-fuel mixture is formed. The air-fuel mixture may have an excess air ratio $\lambda$ of 2.4 or higher, for example. This can reduce the generation of raw NOx, and can improve the exhaust emission performance. In a high load range in the range (i), i.e., in a range including a boundary between the range (i) and a range (ii), the air-fuel mixture has the theoretical air-fuel ratio ($\lambda \approx 1$).

In the CI mode, the fuel is injected into the cylinder 18 at least in the period from the intake stroke to the intermediate stage of the compression stroke in the range (ii) where the load is higher than the load in the range (i), like in the high load range in the range (i) (see FIG. 5A). Thus, the homogeneous air-fuel mixture having the theoretical air-fuel ratio ($\lambda \approx 1$) is formed in the cylinder 18.

In the range (ii), the high temperature hot EGR gas and the low temperature cooled EGR gas are introduced into the cylinder 18 in an appropriate ratio. This optimizes the compression end temperature in the cylinder 18, and stabilizes the compression ignition combustion while ensuring the ignitability of the compression ignition, and avoiding rapid combustion. An EGR ratio, which is a ratio of an EGR gas, i.e., a mixture of the hot EGR gas and the cooled EGR gas introduced into the cylinder 18, is set as high as possible under the condition that the A/F of the air-fuel mixture $\lambda \approx 1$. Therefore, in the range (ii), the EGR ratio gradually decreases because the amount of the injected fuel increases with the increase in load of the engine.

A range (iii) where the load is the highest in the CI mode and a boundary between the CI mode and the SI mode exists corresponds to the range (II) in the operation range shown in FIG. 4. In this range, the temperature in the cylinder 18 is controlled, and the high pressure retarded injection is performed.

While the operation range in the CI mode is divided into the three ranges in accordance with the level of the load of the engine, an operation range in the SI mode is divided into two ranges, i.e., a range (iv) and a range (v), in accordance with the level of the engine speed. In the illustrated example, suppose that the operation range of the engine 1 is divided into a low speed range and a high speed range, the range (iv) corresponds to the low speed range, and the range (v) corresponds to the high speed range. A boundary between the range (iv) and the range (v) is tilted in the direction of the engine speed relative to the level of the load in the operation range shown in FIG. 17. However, the boundary is not limited to the illustrated boundary.

The range (iv) corresponds to the range (IV) in FIG. 4. The injector 67 performs the retarded injection (see FIG. 5C). The range (v) corresponds to the range (V) in FIG. 4. The injector 67 performs the split injection including the retarded injection (see FIG. 5D).

In this operation range in the warm state, the above-described transitional control may be performed in switching from the range (iv) or the range (v) in which the engine 1 is operated in the SI mode to the range (i), the range (ii), or the range (iii) in which the engine 1 is operated in the CI mode, for example.

Other Embodiments

The disclosed technology is not limited to the application to the engine configured as described above. For example, in the intake stroke, the fuel injection from the injector 67 disposed in the cylinder 18 may be replaced with the fuel injection into the intake port 16 through a port injector provided in the intake port 16.

The engine 1 is not limited to the in-line four-cylinder engine, and may be an in-line three-cylinder engine, an in-line two-cylinder engine, an in-line six-cylinder engine, etc. The disclosed technology is applicable to various types of engines, such as a V-type six-cylinder engine, a V-type eight-cylinder engine, a horizontally opposed four cylinder engine, etc.

In the above description, the air-fuel mixture has the theoretical air-fuel ratio ($\lambda \approx 1$) in the predetermined operation range. However, the air-fuel mixture may have a lean air-fuel ratio. Note that setting the air-fuel ratio to the theoretical air-fuel ratio is advantageous because the three-way catalyst can be used.

The high pressure retarded injection may be replaced with the split injection as needed. Likewise, the injection in the intake stroke may be replaced with the split injection as needed. In the split injection, the fuel may be injected in each of the intake stroke and the compression stroke.

DESCRIPTION OF REFERENCE CHARACTERS

1 Engine (engine body)
10 PCM (controller)
18 Cylinder
21 Intake valve
22 Exhaust valve
25 Spark plug
50 EGR passage (exhaust returning apparatus)
51 Main passage (exhaust returning apparatus)
511 EGR valve (exhaust returning apparatus)
52 EGR cooler (exhaust returning apparatus)
53 EGR cooler bypass passage (exhaust returning apparatus)
531 EGR cooler bypass valve (exhaust returning apparatus)
67 Injector (fuel injection valve)
71 VVL (exhaust returning apparatus, internal EGR regulator)
72 VVT (valve mechanism)
73 VVL (valve mechanism)
74 CVVL (valve mechanism)

The invention claimed is:
1. A spark ignition engine comprising:
an engine body having a cylinder;
a spark plug disposed to face an inside of the cylinder, and configured to ignite an air-fuel mixture in the cylinder;
an exhaust returning apparatus configured to introduce an exhaust gas into the cylinder; and
a controller configured to operate the engine body by controlling at least the spark plug and the exhaust returning apparatus, wherein
the controller performs switching between a compression ignition mode in which compression ignition combustion is performed by auto-ignition of the air-fuel mixture in the cylinder to operate the engine body, and a spark ignition mode in which spark ignition combustion is performed by driving the spark plug to ignite and combust the air-fuel mixture in the cylinder to operate the engine body,
the controller controls the exhaust returning apparatus at least in the compression ignition mode to introduce the exhaust gas into the cylinder so that an EGR ratio which is a ratio between an amount of the exhaust gas to a total amount of a gas in the cylinder is a predetermined value, and the controller reduces an amount of the exhaust gas introduced into the cylinder and increases an amount of fresh air introduced in the cylinder to reduce the EGR ratio to be lower than the EGR ratio set in the compression ignition mode, and to make an air-fuel ratio of the air-fuel mixture in the cylinder lean of a theoretical air-fuel ratio and lean of the air-fuel ratio in the spark ignition mode before switching the engine body to the compression ignition mode, and makes the ignition plug inactive, thereby switching the engine body operated in the spark ignition mode to a transitional mode in which the compression ignition combustion is performed before switching to the compression ignition mode.

2. The spark ignition engine of claim 1, wherein
the exhaust returning apparatus includes an internal EGR regulator for regulating an amount of the exhaust gas remaining in the cylinder in a period from an exhaust stroke to an intake stroke, and
the controller controls the internal EGR regulator to reduce the amount of the exhaust gas remaining in the cylinder in the spark ignition mode and the transitional mode, and controls the internal EGR regulator so that the EGR ratio is the predetermined value in accordance with the amount of the exhaust gas remaining in the cylinder in the compression ignition mode.

3. The spark ignition engine of claim 2, further comprising:
a valve mechanism configured to control operation of an intake valve and an exhaust valve, wherein
the valve mechanism constitutes the internal EGR regulator,
the valve mechanism performs a first valve operation of opening the exhaust valve in the exhaust stroke, and opening the intake valve in the intake stroke in the spark ignition mode,
the valve mechanism, in addition to the first valve operation, brings the exhaust valve in an open state at timing later than timing of closing the exhaust valve in the first valve operation, or brings the intake valve in an open state at timing earlier than timing of opening the intake valve in the first valve operation in the compression ignition mode, and
the valve mechanism performs the first valve operation to operate the intake valve and the exhaust valve in the transitional mode.

4. The spark ignition engine of claim 2, further comprising:
a valve mechanism configured to control operation of an intake valve and an exhaust valve wherein
the valve mechanism constitutes the internal EGR regulator,
in switching from the spark ignition mode to the compression ignition mode through the transitional mode,
the valve mechanism performs a first valve operation of opening the exhaust valve in the exhaust stroke, and opening the intake valve in the intake stroke in the spark ignition mode,
the valve mechanism performs a second valve operation of opening the intake valve for a shorter period than a period for opening the intake valve in the first valve operation in the transitional mode, and
the valve mechanism performs, in addition to the second valve operation, a third valve operation of bringing the exhaust valve in an open state at timing later than timing of closing the exhaust valve in the second valve operation in the compression ignition mode.

5. The spark ignition engine of claim 2, further comprising:
a valve mechanism configured to control operation of an intake valve and an exhaust valve, wherein
the valve mechanism constitutes the internal EGR regulator,
in switching from the spark ignition mode to the compression ignition mode through the transitional mode,
the valve mechanism performs a first valve operation of opening the exhaust valve in the exhaust stroke, and opening the intake valve in the intake stroke in the spark ignition mode,
the valve mechanism performs a second valve operation of opening the exhaust valve for a shorter period than a period for opening the exhaust valve in the first valve operation in the transitional mode, and
the valve mechanism performs, in addition to the second valve operation, a third valve operation of bringing the intake valve in an open state at timing earlier than timing of opening the intake valve in the second valve operation in the compression ignition mode.

6. The spark ignition engine of claim 2, wherein
the controller switches the engine body from the compression ignition mode to spark ignition mode without intervention of the transition mode.

7. The spark ignition engine of claim 2, further comprising:
a fuel injection valve configured to directly inject a fuel in the cylinder, wherein
the controller controls the fuel injection valve to inject the fuel at timing after an intermediate stage of a compression stroke in accordance with temperature in the cylinder after the engine body is switched from the spark ignition mode to the transitional mode.

8. The spark ignition engine of claim 3, further comprising:
a fuel injection valve configured to directly inject a fuel in the cylinder, wherein
the controller controls the fuel injection valve to inject the fuel at timing after an intermediate stage of a compression stroke in accordance with temperature in the cylinder after the engine body is switched from the spark ignition mode to the transitional mode.

9. The spark ignition engine of claim 3, wherein
the controller switches the engine body from the compression ignition mode to the spark ignition mode without intervention of the transition mode.

10. The spark ignition engine of claim 4, wherein
the controller switches the engine body from the compression ignition mode to the spark ignition mode without intervention of the transition mode.

11. The spark ignition engine of claim 4, further comprising:
a fuel injection valve configured to directly inject a fuel in the cylinder, wherein
the controller controls the fuel injection valve to inject the fuel at timing after an intermediate stage of a compression stroke in accordance with temperature in the cylinder after the engine body is switched from the spark ignition mode to the transitional mode.

12. The spark ignition engine of claim 5, wherein
the controller switches the engine body from the compression ignition mode to the spark ignition mode without intervention of the transition mode.

13. The spark ignition engine of claim 5, further comprising:
- a fuel injection valve configured to directly inject a fuel in the cylinder, wherein
- the controller controls the fuel injection valve to inject the fuel at timing after an intermediate stage of a compression stroke in accordance with temperature in the cylinder after the engine body is switched from the spark ignition mode to the transitional mode.

14. The spark ignition engine of claim 1, wherein
- the controller switches the engine body from the compression ignition mode to the spark ignition mode without switching the engine body to the transitional mode.

15. The spark ignition engine of claim 14, further comprising:
- a fuel injection valve configured to directly inject a fuel in the cylinder, wherein
- the controller controls the fuel injection valve to inject the fuel at timing after an intermediate stage of a compression stroke in accordance with temperature in the cylinder after the engine body is switched from the spark ignition mode to the transitional mode.

16. The spark ignition engine of claim 1, further comprising:
- a fuel injection valve configured to directly inject a fuel in the cylinder, wherein
- the controller controls the fuel injection valve to inject the fuel at timing after an intermediate stage of a compression stroke in accordance with temperature in the cylinder after the engine body is switched from the spark ignition mode to the transitional mode.

\* \* \* \* \*